(12) United States Patent
Stem

(10) Patent No.: US 12,049,580 B2
(45) Date of Patent: Jul. 30, 2024

(54) COHERENT POLY PROPAGATION MATERIALS WITH 3-DIMENSIONAL PHOTONIC CONTROL OVER VISIBLE LIGHT

(71) Applicant: Michelle R Stem, Big Rapids, MI (US)

(72) Inventor: Michelle R Stem, Big Rapids, MI (US)

(*) Notice: Subject to any disclaimer, the term of this patent is extended or adjusted under 35 U.S.C. 154(b) by 865 days.

(21) Appl. No.: 17/039,141

(22) Filed: Sep. 30, 2020

(65) Prior Publication Data

US 2021/0108136 A1    Apr. 15, 2021

Related U.S. Application Data

(60) Provisional application No. 62/915,171, filed on Oct. 15, 2019.

(51) Int. Cl.
| | | |
|---|---|---|
| C09K 11/06 | (2006.01) | |
| C09K 11/60 | (2006.01) | |
| G02B 1/00 | (2006.01) | |

(52) U.S. Cl.
CPC ............ *C09K 11/06* (2013.01); *C09K 11/607* (2013.01); *G02B 1/005* (2013.01); *G02F 2202/022* (2013.01); *G02F 2202/32* (2013.01)

(58) Field of Classification Search
CPC ...... C09K 11/06; C09K 11/607; G02B 1/005; G02F 2202/022; G02F 2202/32
See application file for complete search history.

(56) References Cited

U.S. PATENT DOCUMENTS

| | | | | |
|---|---|---|---|---|
| 6,261,469 B1* | 7/2001 | Zakhidov | ............... | C04B 38/045 |
| | | | | 427/255.12 |
| 7,106,938 B2* | 9/2006 | Baek | ...................... | B82Y 20/00 |
| | | | | 438/31 |
| 8,477,402 B2* | 7/2013 | Duncan | .................. | G02B 1/005 |
| | | | | 359/291 |

(Continued)

OTHER PUBLICATIONS

Bettina V. Lotsch and Geoffrey A. Ozin. All-Clay Photonic Crystals. J. Am. Chem. Soc. 2008, 130, 15252-15253 (Year: 2008).*

(Continued)

*Primary Examiner* — Collin X Beatty

(57) ABSTRACT

Nano-silicates are the template for photonic control materials with research for a material allowing three-dimensional (3-d) photonic control ongoing for years. This author discovered a material that physically enables 3-d photonic control over the visible spectrum via the previously unidentified property of coherent poly propagation (CPP). CPP allows actualized 3-d photonic demultiplexing in several precious opal nano-silicate specimens. This is a working material that accurately demultiplexes, up/downconverts and propagates the shapes of several types of mono and polychromatic incident light sources. This material is a durable 3-d demultiplexing photonic waveguide that works without cables. The propagated shapes are able to be manually moved across the 3-d specimen surfaces. Other, previously unknown, properties displayed by this material: spectrophotometric and polariscopic play-of-color, plus photonic rotational symmetry. This material is environmentally friendly, in that it emits no beta or alpha particles, performs at ambient temperatures/pressures and is made of commonly available silica.

2 Claims, 1 Drawing Sheet

(56) References Cited

U.S. PATENT DOCUMENTS

| | | | | |
|---|---|---|---|---|
| 8,676,016 B2* | 3/2014 | Arsenault | ............... | B82Y 20/00 |
| | | | | 385/129 |
| 9,022,648 B2* | 5/2015 | Vanier | ..................... | B82Y 40/00 |
| | | | | 374/161 |
| 9,389,440 B2* | 7/2016 | Arsenault | .................. | G02F 1/19 |
| 10,425,706 B2* | 9/2019 | Krug | ................... | H04Q 11/0005 |
| 2002/0074537 A1* | 6/2002 | John | ..................... | G02B 6/1225 |
| | | | | 252/301.5 |
| 2003/0103721 A1* | 6/2003 | Padmanabhan | ...... | G02B 6/1225 |
| | | | | 385/24 |
| 2003/0123827 A1* | 7/2003 | Salerno | .................. | B82Y 20/00 |
| | | | | 385/27 |
| 2003/0156319 A1* | 8/2003 | John | ...................... | B82Y 20/00 |
| | | | | 359/341.5 |
| 2020/0347517 A1* | 11/2020 | Gabl | ........................ | C01B 33/12 |

OTHER PUBLICATIONS

Michelle R. Stem, Coherent Poly Propagation Materials with 3-Dimensional Photonic Control Over Visible Light, PLoS ONE, Oct. 17, 2019, 14(10): e0223715. https://doi.org/10.1371/journal.pone.0223715.

* cited by examiner

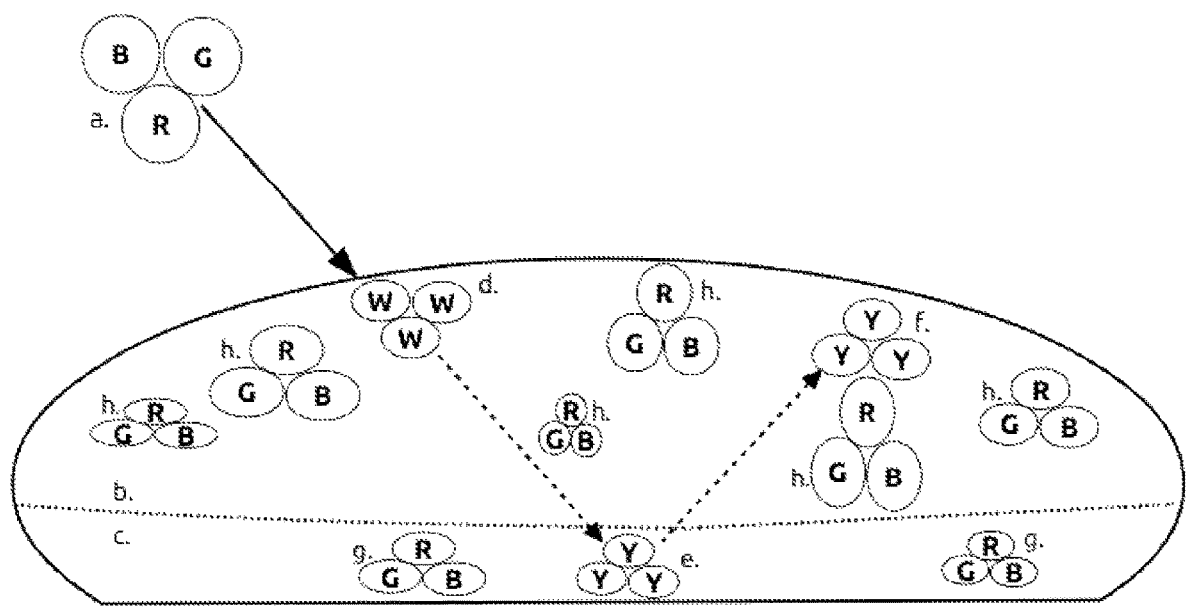

COHERENT POLY PROPAGATION MATERIALS WITH 3-DIMENSIONAL PHOTONIC CONTROL OVER VISIBLE LIGHT

CROSS REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not a joint research agreement

REFERENCE TO SEQUENCE LISTING, A TABLE, OR A COMPUTER PROGRAM LISTING COMPACT DISC APPENDIX

Not Applicable

BACKGROUND OF THE INVENTION

The development of three dimensional (3-d) electron travel control has enabled applications, such as communications networks and advanced computer components (e.g. processors, memory, chips and hard drives). The gradual miniaturization of these components has driven advancements in the many applications of three dimensional electron controlling materials. However, this miniaturization has begun to experience limits. Electrons moving along a prescribed path within a material, require a minimum path width to prevent the electrons from moving off-path. Errant electrons can cause loss of signal integrity and interference with other pathways. Relative to photons, electrons travel at slower speeds that limit the rate of data that can flow along one pathway. Hence, there has been an increasing drive to develop materials that control photons for further technological advancements. Some advances have been made on one dimensional photonic control materials and far fewer on two dimensional photonic control materials. This disclosure describes the properties of the first working material made of nano-silicates or nano-silicate type assemblies to actually demonstrate three dimensional photonic control via the previously undiscovered properties of coherent poly propagation (CPP) and unexpected rotational symmetry over visible light at ambient conditions with no radioactive or toxic components. This control includes 3-d photonic demultiplexing, upconversion, downconversion, rotational symmetry and more as a composition of matter discovery.

BRIEF SUMMARY OF THE INVENTION

The present research discovered and examined materials demonstrating the previously undiscovered properties of coherent poly propagation (CPP) and rotational symmetry. The materials were amorphous silicates as precious opals. CPP caused coherent diffraction of incident poly and monochromatic light. Apart from the iconic play-of-color of precious opal, CPP specimens demonstrated diffractive photonic demultiplexing and/or upconversion and/or downconversion of incident mono and polychromatic visible light with strong photonic coherence such that the shape of the incident light source was propagated over three dimensions over multiple visible frequencies. CPP events manifested as each specimen was rocked/moved under the incident light. Additionally, the specimens demonstrated atypical photonic control over internally reflected and transmitted light via axial rotational symmetry. Amorphous materials would be expected to exert no symmetry control. The CPP and rotational properties occurred at ambient conditions in isolation from exogenous thermal, photonic and electrical influences. To examine the specimens, several non-destructive analytical instruments were employed, such as: spectrophotometer, polariscope and refractometer. The analytical methods revealed unusual behaviors of these specimens. The application of materials made of nano-silicates or nano-silicate type assemblies demonstrating three-dimensional photonic control of CPP and axial rotational symmetry will have far-reaching implications for many industries, including: security, communications, cryptography, imaging, projections, defense, computers, photonic waveguides, 3-d photonic control, microscopy, fiber optics, photonic wavelength demultiplexing and more. Some specific potential applications include: multiple simultaneous wavelength transmissions (simulpathing) of tamper sensitive data, non-repudiation through selective wavelength masking and watermarking of transmissions by adding or deleting specific wavelengths, creation of real-time false ghost projections of assets (e.g. military planes in-flight, drones, ground-based items), simultaneous calculation/verification of data in a multi-optical processor environment, real-time simultaneous imaging over multiple wavelengths without the time-delay and vulnerability of current methods of: image processing, photonic demultiplexing, multi-cast capable fiber switches and routers to bypass the current photon/electron/photon conversions and enable rotational shifting of transmitted fiber optic data with wavelength alteration.

BRIEF DESCRIPTION OF THE DRAWING

FIG. 1. Graphical depiction of CPP and PPOI with axial rotation. a. incident light, b. proximal side above the dotted line, c. distal side below the dotted line, d. incident PPOI, e. rotated transmitted PPOI, f. rotated reflected PPOI, g. rotated transmitted CPP, h. rotated reflected CPP. Dotted lines with arrows depict photon flow. Dotted line without arrows depict demarcation between proximal (top) and distal (underside) sides. The color codes are B=blue, G=green, Y=yellow, R=red and W=white. These codes are only representational since the actual material displays demultiplexing plus up/downconversion over the full visible spectrum.

CPP and PPOI events assume the shape of the incident light source, but at axially rotated orientations after the incident PPOI. Generally, the CPP property propagates multiple events in each specimen. While CPP events sometimes propagate the incident colors, they also upconvert and/or downconvert incident colors across the visible spectrum. Conversion also occurs as CPP events glide over the surface of a specimen while rotated under the incident light.

DETAILED DESCRIPTION OF THE INVENTION

Introduction

Natural precious opals are comprised, mostly, of nano-sized silicate spheres and adsorbed $H_2O$. A silicate matrix ($SiO_2$:$H_2O$) has variably sized spheres with no play-ofcolor. In this matrix are embedded pseudo-crystalline zones (PCZs) with uniformly sized, highly ordered spheres of variable overall dimensions. PCZ boundaries, depths and orientations vary. Each PCZ diffracts incident light independently of the other PCZs, causing opal's iconic play-of-color. Precious opal is like an amorphous sea of non-uniform hydrated silicate nanospheres, embedded with islands of PCZs.

Opal has been, and remains, a template for photonic control materials. Strides have been made towards achieving two-dimensional photonic control. Research for a material that allows 3-d photonic control has been attempted for years. This author is the first to discover a working material made of nano-silicates or nano-silicate type assemblies that actually affects 3-d photonic control over the visible spectrum. The material is a new form of demultiplexing photonic waveguide without cables.

The author discovered and examined eight specimens of precious opal that actualize 3-d visible light photonic control via the previously unidentified property of coherent poly propagation (CPP). CPP allowed this researcher to exert 3-d photonic demultiplexing. The specimens diffracted incoming visible light while accurately propagating the shapes of the incident photon sources over some or all of each diffracted frequency. The propagated shapes were able to be manually moved over the curved surfaces of three dimensional specimens by altering the angles of incidence relative to the viewer. In addition, the specimens exerted a previously unknown photonic rotational symmetry operation. (FIG. 1) CPP materials have potential applications in many fields. The rotational symmetry operation may allow a photonic means to generate computational yes/no or one/zero signals which contrasts with the current methods that are electron limited. Security, communications, cryptography and imaging are a few areas that may be affected by CPP. A few specific examples are: multiple simultaneous wavelength transmissions (simulpathing) of tamper sensitive data, non-repudiation through selective wavelength masking and water-marking of image transmissions by adding or deleting specific wavelengths. Projections and defense may be affected by the ability to create real-time false ghost projections of high value assets, such as: military planes in-flight, drones, ground-based and other assets. Computers may be affected by the simultaneous calculation/verification of critical data in a multi-optical processor environment, corresponding to a photonic version of the multi-electron-based processor systems currently deployed. Microscopy may be affected by enabling real-time simultaneous imaging over multiple wavelengths without the time-delay and computational vulnerability of current image processing. The CPP property and symmetry operation may affect fiber optics. Current photonic wavelength demultiplexing requires poly-frequency photons be transitioned to and diffracted by intermediate materials where the fiber optic system loses photon density and signal integrity. The CPP property may be developed to be deployed in-line to lessen such loss via the creation of multi-cast capable fiber switches and routers that do not require an electron conversion step. Furthermore, application of CPP to fiber optic cables may enable rotational shifting of transmitted fiber optic data with wavelength alteration. As stated, further development of CPP materials with 3-d photonic control will have far-reaching, positive and disruptive implications for many industries and fields, such as: photonic wavelength demultiplexing, fiber optics, imaging, microscopy, projections, security, cryptography, computers and communications.

Materials and Methods

General

The author examined eight specimens of naturally occurring, untreated precious opal (Table 1) from two geographical regions displaying these new properties. Five of the specimens (3, 5, 6, 7 and 8) originated from mines in the Welo region of Ethiopia (11° 20' N, 40° 00' E) and three of the specimens (1, 2 and 4) originated from mines in the Magdalena region of Mexico (20° 55' N, 103° 57' W). All specimens were obtained by the author via retail purchases in the USA. The author was not involved in the mining process for any of the specimens. It is not possible to provide further specific geographical coordinates for the mines because the Welo Ethiopia and Magdalena Mexico areas have numerous mines operated by variously sized operators. Identifying the specific mines from which each specimen originated may not be possible because there are likely to be no consistent chemical differences between the various mines in each of the two areas. Even so, determination would require additional funding, substantial numbers of specimens and destructive testing.

Untreated specimens were not dyed, coated, heated, infused, sealed, irradiated, or made in a laboratory. All specimens were shaped into oval or round cabochons except for one specimen that was partially faceted. None of the specimens emitted alpha or beta particles in detectable levels and the only chemicals to which the specimens were exposed were $H_2O(l)$ and ambient air. In various light sources, the specimens displayed mild to intense play-of-color and contra luz. Seven specimens were colorless transparent and one specimen was orange transparent. The specimens were viewed from the same side onto which the light was incident (proximal) and from the side opposite to the one onto which the light was incident (distal).

TABLE 1

| Materials and equipment. | |
|---|---|
| Materials and Equipment | Description |
| Laser | 650 nm, <5 mW, constant wave |
| Laser | 593.5 nm, <5 mW, constant wave |
| Laser | 532 nm, <5 mW, constant wave |
| Laser | 450 nm, <5 mW, constant wave |
| Laser | 405 nm, <5 mW, constant wave |
| Long wave ultraviolet (LWUV) | 375 nm, visible light quartz filter, 6 W Hg fluorescent bulb |
| Mid wave ultraviolet (MWUV) | 307 nm, visible light quartz filter, 6 W Hg fluorescent bulb |
| Short wave ultraviolet (SWUV) | 254 nm, visible light quartz filter, 6 W Hg fluorescent bulb |

TABLE 1-continued

Materials and equipment.

| Materials and Equipment | Description |
|---|---|
| Polychromatic light source, LED | 6500 K (2000-6500 K), CRI > 90, 14 W, IR and UV filters, TaoTronics Elune LED desk lamp, model TTDL02 |
| Polychromatic and monochromatic light source, fiber optic | 6000 K, CRI = 90, 75 W, DMX, Chinly |
| Polychromatic light source, compact fluorescent | 5500 K, CRI = 90, 23 W, full spectrum, generic articulated arm desk lamp |
| Polychromatic light source, halogen | 3200 K, CRI = 100, 15 W, microscope stage light |
| Microscope | Amscope, model SM-2TYY, magnification 4-180 |
| Camera, microscope | Amscope, 10 MP, model MW1000-ck |
| Camera, macro | Nikon Coolpix L820 |
| Colorimeter | Sekonic C-700-U, MPN 401-702, CMOS linear image sensor, $\lambda$ = 380-780 nm |
| Infrared (IR) thermal imager | Range: −50-380° C. |
| Mass balance | Gem Pro digital, range: 0.025-125.000 g |
| Spectrophotometer | Single beam, range: $\lambda$ = 320-1100 nm |
| Refractometer | Sinotech digital, range: 1.300-2.100 |
| Thermal conduction analyzer | Presidium |
| Dichroscope | Calcite |
| Polariscope | Tabletop model |

Hydration

To maximize reproducibility, each specimen was kept at maximum hydration prior to conducting each step in analysis. Changes in internal hydration levels could have affected the measured and computed values. Hence, before each research step, each specimen was submerged in individual containers of purified $H_2O(l)$ for at least twenty four hours and then dried with a Kim-Wipe until dry to the touch (a few seconds). Between analyses, each specimen was re-submerged in $H_2O(l)$.

Ambient Incident Photonic and Electronic Control

Photons and electrons that were exogenous to the analysis of the specimens were controlled to ensure that experiment observations were limited to responses due to the internal properties of the specimens. Each phase of analyzing these specimens was conducted such that extraneous photons and electrons in the laboratory were severely minimized in order to maximize the reliability/repeatability of observations and enhance the detection of properties which may be sensitive to, or affected by, stray photons. Minimal ambient light in the laboratory was established by closing all doors, closing all window coverings, covering windows with light blocking materials, shutting off or covering all undesired nearby photon sources and conducting observations after astronomical twilight. Yet, observations did not occur under conditions of total darkness because one closed door was not covered with light-blocking materials and three LED lights from switches of in-use laboratory equipment in the room were blocked, not extinguished. The door and LEDs were located indirectly and at least three meters from the experimental set-up. Minimal ambient light was defined as a density of photons that was too low to register on the colorimeter in any visible frequency (Table 1). All electrical cables or potential sources of static electricity were either disconnected, grounded or damped magnetically.

To minimize reflections or some other exogenous stray photon source for macroscopic observations, each specimen was examined while held aloft in an articulating, photonically unresponsive holder at approximately 35 mm above a photonically unresponsive surface of neutral light beige color. For microscopic observations, each specimen was examined on a photonically unresponsive white microscopy plate. All lamps, holders, materials and clothing were tested to ensure that none were photonically responsive to any of the wavelengths being utilized. Being not photonically responsive meant that the each component of the set-up had minimal reflectivity and did not display, or cause any specimens to display, photonic reactivity to any of the wavelengths applied (e.g. no color change, fluorescence, phosphorescence, or reflected colors).

Incident Light Sources

A series of sixteen different photon sources were made incident upon each specimen, including: four visible light polychromatic, four monochromatic visible light sources, three ultraviolet (UV) frequencies and five visible light laser frequencies (Table 1). The purpose of these exposures was to identify and examine the photonic properties and behaviors of each research specimen relative to the CPP property. Each of the non-laser visible light sources was analyzed via colorimetry. However, a colorimetric scan of the blue fiber optic light source was not possible because the colorimetric temperature of the blue light exceeded the analytical capability of the colorimeter. Observations with most of the photon sources were conducted by varying the photonic angles of incidence, relative to the specimen and viewer. Only laser sources were observed with the specimens in a fixed position relative to the incident lasers via careful aim of the incident photonic point of impact (PPOI) (FIG. 1). The specimens were observed macroscopically and microscopically while exposed to each photon source.

Of the visible light sources, six of them were fiber optic cables (Table 1). The fiber optic research set-up consisted of clusters of fiber optic cables that transmitted two polychromatic and four monochromatic light sources. A cluster of three cables of unfiltered polychromatic light was made incident on each specimen. Using the same light source, four clusters, each of three cables were prepared with the transmissive ends of each of the four clusters of three cables dyed monochromatically with archival quality, acid free pigment inks (one cluster each of blue, green, yellow and red). One other polychromatic source was a twelve cable bundle of all four of the monochromatic fiber optic clusters. Thus, a range of six mono and polychromatic fiber optic clusters was made incident on each specimen. A series of five laser sources were made incident upon each of the specimens (Table 1). Because the external housing diameters of each laser was less than 10 mm, each laser was small enough to be held in a motionless laser lamp holder. To further avoid misalignments and/or vibrations, each laser was activated via a remote control on/off switch. Further minimization of vibration was accomplished with anti-vibration insulation under all equipment and halted movement in the building. Each laser was aligned to intersect with each specimen long-wise.

A series of three UV photon sources were made incident on each of the specimens (Table 1). Because the external housing of each of the UV source lamps was comparable to a large flashlight, each lamp was too large to be secured in a standard laser lamp holder. Since vibration was not a significant concern with these light sources, each lamp was secured to a ring-stand with clamps and hand-held. Examination of the specimens occurred with the UV sources kept stationary (ring-stand) while the specimens were made mobile in an articulated holder and while the specimens were kept stationary while the UV sources were made mobile (hand-held).

Spectrophotometer

Solid-state spectrophotometric analytical scans were conducted on each of the specimens over 320 to 1100 nm (Table 1). Each specimen had four spectrophotometric scans, with the specimen placed in a series of four different orientations for each scan: proximal to distal, distal to proximal, side to side narrow-wise, and side to side long-wise. For each specimen, the proximal side was the dome, the distal side was the flat side opposite the proximal, and narrow-wise to long-wise were profile views of the specimens that were perpendicular to each other. These analyses showed the levels of photonic absorption of each specimen when exposed to a visible light range of spectrophotometric wavelengths.

Refractive Index

Refractive index (RI) analysis was conducted on each specimen (Table 1). RI is a common test to help identify the material composition of minerals. To avoid absorption of the oil used for traditional RI analysis, these specimens were examined using an oil-less electronic RI. In addition to confirming the mineral species of the specimens, RI was used to try to ascertain whether the density of PCZs in any of the specimens would alter any of the RI responses to more closely resemble that for crystalline silicates.

Thermal Conductivity

The thermal conductivity of each specimen was tested (Table 1). Thermal conductivity is a common test to help identify many types of minerals. Thermal conductivity examines how quickly the surface temperature of a specimen can be changed by a focused input of heat. The Presidium tester shows where the thermal conductivity value for the specimen falls in relation to an overlapping series of ranges relative to known types of minerals. Each specimen was held in a non-conductive holder and analyzed at several places along the surface. In addition to confirming the mineral species of the specimens, thermal conductivity helped to ascertain whether PCZs made the thermal conductivity of any of the specimens more closely resemble the thermal conductivity of crystalline forms of silicates.

Dichroscope

The dichroscope was used to analyze potential anisotropic differences in the paths that various frequencies of light traveled through each of the specimens (Table 1). The analysis light was a white light LED flashlight typical for use with dichroscopes. As typical for dichroscopic analyses, each specimen was analyzed while held at different angles of view above a non-reflective white microscopy plate.

Polariscope

The polariscope was used to analyze aspects of the photonic control character of each specimen (Table 1). Each specimen was observed while the polarized plates were rotated from maximum to minimum occlusion and while each specimen was rotated 360°. An isotropic single refractive (SR) material usually shows as brightly illuminated throughout a 360° revolution. An isotropic anomalous double refractive (ADR) material usually displays a dark X-like or band-shaped isogyre figure that appears and disappears or flows across the specimen every 90° revolution. ADR for opal requires a portion of its structure to be either crystalline or strained. A double refractive (DR) material can appear to have the same polariscopic response as that for an ADR material, except that a DR material will usually darken when switching between crossed and aligned polarizers.

Results and Discussion

Mass and Hydration

Variable sizes and assemblages of the silicate nanospheres within opals results in great porosity diversity. These pores allow each opal specimen to adsorb/desorb $H_2O(l)$ to varying depths. Hydration levels for each opal specimen vary from 6 to 20% by volume and can be higher. Additionally, the nanosphere character of each specimen, combined with environmental factors (e.g. external $H_2O(g)$ density and temperature), affect dehydration rates. Varying from one specimen to another, precious opals will experience hydration evaporation rates that extend down to sub-surface levels. It is impossible, with current instrumentation, to determine the time necessary for a particular specimen to reach minimum hydration. Gemologists note that more than a year of careful dehydration can be required for opals to reach stable, minimum hydration and less than a day of soaking in $H_2O(l)$ to reach maximum hydration. Amorphous silicates swell and shrink in positive correlation with internal hydration levels. When not at maximum or minimum hydration, accurate determinations of mass, density, volume and specific gravity are only transitorily valid for opal. Hence, the present specimens were examined at maximum hydration. Determinations of mass, minimum/maximum hydration levels, density, volume and specific gravity (SG) were completed for each specimen (Table 2). All specimen values were within the ranges expected for precious opal. The hydrated versus dehydrated differences in mass ranged from minimal for specimens 1, 2, 4 and 8 to notable for specimens 3, 5, 6 and 7, most notably for specimen 5. A comparison of the density, specific gravity and mass values for each specimen at maximum hydration show that specimens 3, 4 and 8 have the most unique combinations of these data. Specimens 3 and 5 became hazy translucent white if more than a few minutes elapsed without immersion in $H_2O(l)$, which is understandable given their maximum hydration levels (Table 2). Interestingly, hydration-related changes in appearance did not appear to be significantly related to the CPP property. There was insufficient evidence to draw conclusions regarding CPP in relation to the data of Table 2.

TABLE 2

Measured, calculated and observed, basic data.

| Analysis (Units) | Specimen 1 | Specimen 2 | Specimen 3 | Specimen 4 | Specimen 5 | Specimen 6 | Specimen 7 | Specimen 8 |
|---|---|---|---|---|---|---|---|---|
| Material type | Precious opal | Precious opal | Precious opal | Precious opal | Precious opal | Precious opal | Precious opal | Precious opal |
| Dimensions (mm) | 8.1 × 7.4 × 3.9 | 7.9 × 5.7 × 4.8 | 10.5 × 8.6 × 3.5 | 8.1 × 6.4 × 3.7 | 14.4 × 10.5 × 3.5 | 11.9 × 8.8 × 4.4 | 10.6 × 10.1 × 8.6 | 12.4 × 9.3 × 6.8 |
| Shape | Oval cabochon | Oval cabochon | Oval cabochon | Oval cabochon | Oval cabochon | Oval cabochon | Octahedral cabochon | Oval cabochon |
| Clarity | Transparent | Transparent | Transparent | Transparent | Transparent | Transparent | Transparent | Transparent |
| Visible response, poly $\lambda$ light | + play-of-color + contra luz | + play-of-color + contra luz | + play-of-color + contra luz | + play-of-color + contra luz | + play-of-color + contra luz | + play-of-color + contra luz | + play-of-color + contra luz | + play-of-color + contra luz |
| Body color, poly $\lambda$ light | Colorless | Colorless | Colorless | Colorless | Colorless | Colorless | Orange | Colorless |
| Mass (g), dehydrated | 0.252 | 0.248 | 0.367 | 0.215 | 0.370 | 0.432 | 0.496 | 0.882 |
| Mass (g), hydrated | 0.259 | 0.250 | 0.419 | 0.218 | 0.482 | 0.487 | 0.540 | 0.900 |
| % $H_2O$, full hydration | 2.70 | 0.80 | 12.41 | 1.38 | 23.24 | 11.29 | 8.15 | 2.00 |
| $H_2O$ density (g/mL), 21.4° C. | 0.9978822 | 0.9978822 | 0.9978822 | 0.9978822 | 0.9978822 | 0.9978822 | 0.9978822 | 0.9978822 |
| Specific gravity | 1.0974576 | 1.0964912 | 1.0883117 | 1.1978022 | 1.0321199 | 1.0274262 | 1.0285714 | 1.0123735 |
| Density (g/mL) | 1.0997868 | 1.0988183 | 1.0906214 | 1.2003443 | 1.0343104 | 1.0296067 | 1.0307544 | 1.0145220 |
| Volume (mL) | 0.2355002 | 0.2275171 | 0.3841846 | 0.1816146 | 0.4660110 | 0.4729962 | 0.5238882 | 0.8871173 |

CPP

Each of the specimens manifested the CPP property repeatedly (FIG. 1) over a period of three years. CPP was displayed under benign conditions that did not require the addition of exogenous thermal, electronic or photonic energy. CPP specimens propagated a variety of incident light shapes and colors without the CPP events being limited by PCZs or the amorphous matrices. A typical PCZ diffracted light independently of the other zones (play-of-color). A fully illuminated PCZ, had, essentially, an on/off photonic response, whereby it displayed play-of-color over the full PCZ. In contrast, a CPP event displayed across and flowed over multiple PCZs. Furthermore, some CPP events were color invariant and some displayed transition of color over the visible spectrum as a specimen and/or light source were rotated or repositioned relative to the viewer.

Symmetry

The specimens displayed a previously undiscovered photonic rotational symmetry. For a typical transparent amorphous material, incident PPOI would match the transmitted PPOI or reflect off the bottom of the specimen to generate a specular mirror image of incident PPOI. However, the research specimens rotated the incident light axially before it was reflected off of or passed through the distal side of a CPP specimen. The specimens rotated axially the incident PPOI for transmitted PPOI, reflected PPOI and the CPP property events (FIG. 1). Rotation of incident light by opal was not documented as having been observed prior to this research.

Polychromatic Light Sources

Five polychromatic, visible light sources were individually made incident upon each of the specimens (Table 1), including: compact fluorescent (CFL), LED, fiber optic polychromatic and fiber optic monochromatic. Each source had a unique colorimetric profile. The applications of multiple colorimetrically different light sources provided a means to conduct comparative analyses of the CPP and other photonic responses of each of the specimens. Further, each source had a different physical bulb shape. Thus, detection of CPP, PPOI, rotational symmetry and other photonic properties was simplified.

CFL

A polychromatic daylight CFL was made incident on each specimen (Table 1). All specimens were transparent. Seven of the specimens displayed some level of CPP. Only specimen 4 did not display CPP. Specimen 3 displayed contra luz CPP. The other seven specimens did not display contra luz CPP. Specimens 2, 3, 7 and 8 displayed transition of color of CPP events. All specimens displayed non-CPP play-of-color. Seven specimens displayed some level of non-CPP contra luz. Only specimen 5 displayed no non-CPP contra luz. The incident light was white. Yet, the reflected PPOI was white for specimens 1, 3 and 8, yellow for specimens 4 and 6, pinkish yellow for specimens 2 and 3 and orange for specimen 7.

LED

A 22 cm long lamp with three rows of eleven polychromatic LED bulbs was made incident on each specimen (Table 1). The LED bulb pattern made the rotation of the incident light more readily identifiable. All specimens were transparent. Seven of the specimens displayed some level of CPP. Only specimen 3 did not display CPP. Specimens 2, 3 and 4 displayed contra luz CPP. Specimens 1, 5, 6, 7 and 8 did not display contra luz CPP. Specimens 2, 3, 4, 6, 7 and 8 displayed transition of color of CPP events. Only specimens 1 and 5 did not display transition of color of CPP events. All specimens displayed non-CPP play-of-color. Specimens 1, 2, 3, 4 and 6 displayed some level of non-CPP contra luz. Specimens 5, 7 and 8 did not display non-CPP contra luz. Although the incident light was white, the reflected PPOI was white for specimens 1, 7 and 8, yellow for specimens 3, 4 and 6, pinkish yellow for specimen 2 and no response for specimen 5.

Fiber Optic

Two different clusters of fiber optic cables, illuminated with a daylight halogen light source, were made incident on each specimen (Table 1). One observation was conducted with a set of cables that were not dyed and another observation was conducted with a set that was dyed quadchromatically. The patterns and/or colors of the cables made the CPP property more readily identifiable.

The first type of cluster was undyed polychromatic fiber optic cables. All specimens were transparent. Specimens 6 and 8 had mild haze. Seven specimens displayed some level of CPP. Only specimen 3 did not display CPP. Specimens 2 and 4 displayed contra luz CPP. Specimens 1, 3, 5, 6, 7 and 8 did not display contra luz CPP. Specimens 2, 3, 4, 6 and 7 displayed transition of color of CPP events. Only specimens 1, 5 and 8 did not display transition of color of CPP events. All specimens displayed non-CPP play-of-color. Specimens 1, 2, 3 and 4 displayed some level of non-CPP contra luz. Specimens 5, 6, 7 and 8 did not display non-CPP contra luz. Although the incident light was white, specimens 1, 3, 4 and 7 displayed white reflected PPOI, specimens 2, 5 and 6 displayed red reflected PPOI and specimen 8 displayed green reflected PPOI.

The second type of cluster was dyed quadchromatically via the combination of four monochromatic clusters of three fiber optic cables (Table 1). Each cluster was dyed one of four colors (red, yellow, green and blue). Applying quadchromatic light was a means to examine the photonic responses of each specimen to a combination of the four monochromatic fiber optic wavelengths. All specimens were transparent. Seven specimens displayed some level of CPP. Only specimen 1 did not display CPP. Specimens 2 and 4 displayed contra luz CPP. Specimens 1, 3, 5, 6, 7 and 8 did not display contra luz CPP. Specimens 2, 4, 5, 6, 7 and 8 showed positive CPP color transformations. Only specimens 1 and 3 showed negative CPP color transformations. Specimens 1, 2, 3, 5, 6 and 7 displayed non-CPP play-of-color. Specimens 4 and 8 did not display non-CPP play-of-color. Specimens 1 and 2 displayed some level of non-CPP contra luz. Specimens 3, 4, 5, 6, 7 and 8 did not display non-CPP contra luz. The reflected PPOI matched all four incident PPOI colors for each of the specimens.

Monochromatic Light Sources

In visible light, a series of monochromatic light sources were made incident on each specimen, including: four fiber optic clusters, five lasers and three UV sources (Tables 1, 3, 4). Differences in incident chromaticity affected the presence, strength and character of each of the observed photonic properties for each specimen. Applying light from clusters of monochromatic and polychromatic fiber optics provided a means to conduct comparative analyses of the photonic responses of the specimens. Applying laser light provided a means to examine the photonic responses of the specimens under uni-directional mono-frequency photonic sources. Applying UV light provided a means to examine the visible light photonic responses of the specimens under non-visible photonic sources.

TABLE 3

Summary of laser photonic responses.

| Laser Analysis | Specimen 1 | Specimen 2 | Specimen 3 | Specimen 4 | Specimen 5 | Specimen 6 | Specimen 7 | Specimen 8 |
|---|---|---|---|---|---|---|---|---|
| 650 nm | + visible path − transmission + smooth glow | − visible path − transmission + grainy glow | + visible path + transmission + smooth glow | + partial visible path − transmission + smooth glow | + visible path − transmission + smooth glow | + visible path − transmission + smooth glow | + visible path − transmission + grainy glow | + visible path − transmission + grainy glow |
| 593.5 nm | + visible path + transmission + grainy glow | − visible path − transmission + grainy glow | + visible path + transmission + grainy glow | + visible path − transmission + grainy glow | + visible path − transmission + grainy glow | + visible path − transmission + grainy glow | + visible path + transmission + grainy glow | + visible path − transmission + grainy glow |
| 532 nm | + visible path − transmission + smooth glow | + visible path − transmission + grainy glow | + visible path + transmission + smooth glow | + visible path + transmission + smooth glow | − visible path − transmission + smooth glow | + visible path − transmission + smooth glow | + visible path − transmission + grainy glow | + visible path − transmission + grainy glow |
| 450 nm | + visible path + transmission + smooth glow | + visible path + transmission + smooth glow 4-ray star | + visible path − transmission + smooth glow | + visible path + transmission − smooth glow | − visible path − transmission + smooth glow | − visible path − transmission + smooth glow | − visible path − transmission + smooth glow | − visible path − transmission + smooth glow |
| 405 nm | + visible path + transmission + smooth glow | + visible path + transmission + smooth glow | + visible path + transmission + smooth glow | + visible path + transmission + smooth glow | − visible path − transmission + smooth glow | − visible path − transmission + smooth glow | − visible path − transmission + smooth glow | + visible path − transmission + smooth glow |

TABLE 4

Summary of UV photonic responses.

| UV Analysis | Specimen 1 | Specimen 2 | Specimen 3 | Specimen 4 | Specimen 5 | Specimen 6 | Specimen 7 | Specimen 8 |
|---|---|---|---|---|---|---|---|---|
| 375 nm | Smooth purple | Smooth purple | Smooth purple | Smooth purple, black, gray, white | Yellow, red & green play-of-color | Smooth purple, pink, black | Yellow, red & green play-of-color | Smooth purple, green, blue |
| 307 nm | Colorless | Colorless | Smooth purple, orange | Smooth orange, colorless | Smooth orange | Smooth purple, orange | Smooth orange | Smooth orange |
| 254 nm | Black | Greenish black | Greenish black | Greenish black | Greenish black | Black, gray, white | Greenish black | Smooth blackish violet, white |

Fiber Optic

Under the monochromatic fiber optic sources, the photonic responses changed as the light source was changed between blue, green, yellow and red. The specimens displayed a range of photonic properties, including upconversion, downconversion, play-of-color, contra luz, CPP, and contra luz CPP.

Blue fiber optic light. Each specimen was positive for CPP at varying levels. Specimens 1, 4 and 6 were negative for non-CPP play-of-color. Specimens 2, 3, 5, 7 and 8 were strongly positive for non-CPP play-of-color. CPP events had one to three colors, with mild to strong color saturation, with tiny to moderate spread and with varying amounts of blur.

Green fiber optic light. Each specimen was positive for CPP at varying levels. Only specimen 1 was negative for non-CPP play-of-color. Specimens 2, 3, 4, 5, 6, 7 and 8 were varyingly positive for non-CPP play-of-color. CPP events had one to four colors, with mild to strong color saturation, with tiny to moderate spread and with varying amounts of blur.

Yellow fiber optic light. Each specimen was positive for CPP at varying levels. Only specimen 4 was only very slightly positive for non-CPP play-of-color. Seven specimens were strongly positive for non-CPP play-of-color. CPP events had three to four colors, with mild to strong color saturation, with very small to moderate spread and with varying amounts of blur.

Red fiber optic light. Seven specimens were positive for CPP at varying levels. Only specimen 3 was negative for CPP. Only specimens 3 and 7 were strongly positive for non-CPP play-of-color. Specimen 7 showed only a few CPP events, but those events included the widest range of CPP colors. CPP events had one to four colors, with mild to strong color saturation, with minimal to very strong spread and with varying amounts of blur.

Laser

Laser-specimen interactions did not trigger a display of the CPP property. The present research examined three aspects of laser-specimen interactions. First, path of traversing through meant that each specimen was observed while each incident laser light traversed through and across the interior of each specimen. Second, passing through intact meant that each specimen was observed for the extent to which each laser light passed coherently through and out the body of each specimen. This observation was made by watching for light on a white board set up approximately 12 cm away from the side of each specimen that was distal from the incident PPOI. Third, body glow meant that each specimen was observed for the presence, brightness, color and texture of body glow in response to each incident laser light.

A 650 nm laser displayed visible, coherent paths through specimens 1, 3, 4, 5, 6, 7 and 8. The laser did not display a visible path while traversing specimen 2. The coherent path for specimen 4 was only present on the side proximal to the incident PPOI. The path for specimen 5 was particularly strong. Specimen 6 displayed a wedge shaped path that was broader at incident PPOI and narrower towards the distal side. Each specimen, in which the traversing laser path was visible, displayed a path that was somewhat wider than the incident PPOI column. Second, only specimen 3 transmitted coherent laser light out of the distal side. Even so, it passed only a very small, weak dot, relative to the incident laser light column. All other specimens experienced total internal reflection, such that each specimen blocked coherent laser light from transmitting through the distal side. Third, all of the specimens displayed body glow. The laser caused a smooth body glow of portions of specimens 1, 3, 4, 5 and 6. The non-glowing areas completely absorbed the incident laser and appeared black. Specimen 4 displayed a particularly strong smooth glow. The laser caused a grainy body glow of specimens 2, 7 and 8. Specimens 2 and 7 had strong grainy glows, whereas specimen 8 had only a mild grainy glow. Specimen 2 exhibited the most unique responses to the 650 nm laser.

A 593.5 nm laser displayed visible, coherent paths through specimens 1, 3, 4, 5, 6, 7 and 8. The paths for specimens 1, 4 and 8 were of mild strength. The path for specimen 5 was particularly strong, but was wider than the paths of the other specimens. The path for specimen 6 showed diminishing strength towards the distal side. The laser did not display a visible path while traversing specimen 2. Each specimen, in which the traversing laser path was visible, displayed a path that was somewhat wider than the incident PPOI column. Second, specimens 1, 3 and 7 transmitted coherent laser light out of the distal side. Even so, the lasing dot for specimen 3 was diffuse and the lasing dots for specimens 1 and 7 were very small and weak, relative to the incident laser light column. Specimens 2, 4, 5, 6 and 8 experienced total internal reflection, such that each specimen blocked coherent laser light from transmitting through the distal side. Third, the laser caused all specimens to display strongly grainy body glow textures. Specimens 2 and 6 exhibited the most unique responses to the 593.5 nm laser.

A 532 nm laser displayed visible, coherent paths through specimens 1, 2, 3, 4, 6, 7 and 8. The path through specimen 2 was of mild strength. Specimen 6 displayed a wedge shaped path that became narrower towards the distal side. The laser did not display a visible path while traversing specimen 5. Each specimen, in which the traversing laser path was visible, displayed a path that was somewhat wider than the incident PPOI column. Second, specimens 3 and 4 transmitted coherent laser light out of the distal side. The exit dot for specimen 3 was diffuse and the exit dot for specimen 4 was very small, relative to the incident laser light column. Specimens 1, 2, 5, 6, 7 and 8 experienced total internal reflection, such that each specimen blocked coherent laser light from transmitting through the distal side. Third, the laser caused a smooth body glow of specimens 1, 3, 4, 5 and 6. Specimen 5 displayed smooth glow over only one third of the specimen on the incident side and was black over two thirds of the distal side. The laser caused specimens 2, 7 and 8 to display a grainy glow. Specimen 7 displayed only mildly grainy texture. Of note, specimen 6 reflected, particularly strongly, the incident PPOI. Specimens 5 and 6 exhibited the most unique responses to the 532 nm laser.

A 450 nm laser displayed visible, coherent paths through specimens 1, 2, 3 and 4. The paths through specimens 1, 2 and 4 were of mild strength and were especially mild for specimens 2 and 4. The laser did not display a visible path while traversing specimens 5, 6, 7 and 8. Each specimen, in which the traversing laser path was visible, displayed a path that was at least slightly wider than the incident PPOI column. Second, specimens 1, 2 and 4 transmitted coherent laser light out of the distal side. The exit dots for specimens 2 and 4 were very small, relative to the incident laser light column. Specimens 3, 5, 6, 7 and 8 experienced total internal reflection, such that each specimen blocked coherent laser light from transmitting through the distal side. Third, the laser caused a smooth body glow of specimens 1, 2, 3, 5, 6, 7 and 8. Specimen 1 displayed only a very mild smooth glow. Specimens 5, 6, 7 and 8 displayed smooth glow over only one third of the specimen on the incident side and black over two thirds of the distal side. The laser was almost completely absorbed by specimen 4, such that the specimen was almost entirely black with only a very slight smooth purple glow. Of note, this laser caused specimen 2 to display a four-ray star, which was previously unknown to occur in opals in response to lasers. Specimens 5, 6, 7 and 8 appeared translucent in response to this laser. Specimens 2 and 4 exhibited the most unique responses to the 450 nm laser.

A 405 nm laser displayed visible, coherent paths through specimens 1, 2, 3, 4 and 8. Yet, the paths through specimens 1, 2 and 8 were barely visible. The laser did not display a visible path while traversing specimens 5, 6 and 7. Each specimen, in which the traversing laser path was visible, displayed a path that was somewhat wider than the incident PPOI column. Second, specimens 1, 2, 3 and 4 transmitted coherent laser light out of the distal side. The exit dot for specimen 1 was very small, relative to the incident laser light column. Specimens 5, 6, 7 and 8 experienced total internal reflection, such that each specimen blocked coherent laser light from transmitting through the distal side. Third, the laser caused a smooth body glow of all specimens. Specimens 5 and 6 displayed smooth purple glow over only one third of the specimen on the incident side and was slightly purplish black over two thirds of the distal side. Specimen 7 exhibited partial total absorption with black over one third of the specimen on the incident side and downconversion to green over two thirds of the distal side. Specimen 8 exhibited downconversion by displaying a smooth green dot at incident PPOI and a smooth purple body glow over its remainder. While specimens 5 and 6 were interesting, specimens 7 and 8 exhibited the most unique responses to the 405 nm laser.

Ultra Violet (UV)

Three mono-frequency UV sources were made incident on each specimen to research the CPP property as well as other photonic properties of the specimens. These observations were made while freely changing the relative positions of the viewer, specimens and light sources. None of the specimens displayed CPP or reflected PPOI in response to UV light. Interestingly, visible light play-of-color was observed in response to UV light, which had not been documented previously.

UV light of 375 nm caused specimens 1, 2, 3 and 8 to exhibit smooth purple violet colors that ranged in strength from mildest for specimen 1 to strongest for specimen 3. Specimens 4 and 6 exhibited black that faded, distally, into gray and white with a smooth purple violet zone. All specimens exhibited Stokes downconversion. Specimens 5 and 7 exhibited previously undiscovered downconversion via play-of-color, showing zones of multiple colors that included yellow, green and red. Specimen 8 exhibited downconversion via central smooth purple violet with an outer rim of blue and green. Specimen 6 exhibited black and downconversion via smooth pink and purple. Specimens 5, 7 and 8 exhibited the most unique responses.

UV light of 307 nm caused specimens 1 and 2 to become colorless and transparent. Specimens 3 and 6 exhibited smooth purplish orange. Specimen 4 became mostly colorless with one thin zone of smooth orange. Specimens 5, 7 and 8 exhibited smooth orange. Specimen 7 displayed very deep orange. Specimens 1, 2 and 4 exhibited the most unique responses.

UV light of 254 nm caused specimens 2, 3, 4, 5 and 7 to exhibit smooth greenish black. Specimens 1 exhibited only black. Specimen 8 exhibited smooth blackish purple violet with a zone of white on one end. Specimen 6 exhibited black that faded into gray and then white. Specimen 1 displayed the most unique responses.

Spectrophotometry

Solid state spectrophotometric scans, over four orientations, were conducted on each specimen to research the nature of CPP and to test whether the photonic absorption properties of each specimen were internally uniform or directionally sensitive. Each specimen was a non-crystalline silicate with PCZs and visibly uniform color. Hence, each specimen was expected to have an overall non-uniform distribution of molecular structure that did not affect photonic flow. For most of the specimens, the spectrophotometric scans showed significant analytical differences from scan to scan. Although each scan showed a generally negative correlation with absorption wavelength, some of the scans were very complex. The spectrophotometric scans showed that varying wavelengths of light were absorbed by specimens that should have been almost entirely photonically non-absorptive over visible light because the specimens were either colorless, hazy white or orange. A comparison of the four scans of each specimen revealed that the photonic absorption by these uniformly colored amorphous silicate materials could be affected by specimen orientation.

TABLE 5

Comparison summary of select instrumentation analyses.

| Analysis Method | Specimen 1 | Specimen 2 | Specimen 3 | Specimen 4 | Specimen 5 | Specimen 6 | Specimen 7 | Specimen 8 |
|---|---|---|---|---|---|---|---|---|
| Spectrophotometer | Typical | Some variations, especially at higher $\lambda$ | Not typical at any $\lambda$ | Some variations, especially at lower and higher $\lambda$ | Not typical at any $\lambda$ | Scans 1 and 2 were not typical at any $\lambda$ | Not typical at any $\lambda$ | Not typical at any $\lambda$ |
| Refractive Index | 1.420 | 1.380 | 1.395 | 1.380 | 1.432 | 1.459 | 1.362 | 1.365 |
| Thermal Conductivity | Typical | Typical | Typical | Typical | Typical | Typical | Typical | Typical |
| Dichroscope | Monochroic colorless body | Monochroic colorless body, Dichroic contra luz | Monochroic colorless body, Dichroic contra luz | Monochroic colorless body, Dichroic contra luz | Monochroic colorless body, Dichroic contra luz | Monochroic colorless body, Dichroic contra luz | Monochroic colorless body, Dichroic contra luz | Monochroic colorless body, Dichroic contra luz |
| Polariscope | Isotropic singly refractive ADR | Isotropic singly refractive ADR | Isotropic singly refractive ADR | Isotropic singly refractive ADR | Isotropic singly refractive | Isotropic singly refractive ADR | Isotropic singly refractive | Isotropic singly refractive |

Refractive Index

RI identified each specimen as a non-crystalline opal silicate. There were insignificant differences in readings between each specimen. Thus, the total volume, alignment and dispersion of PCZs in these precious opal specimens were not sufficient to cause a significant change in RI from that of amorphous opal.

Thermal Conductivity

Thermal conductivity analysis identified each specimen as a non-crystalline silicate. There were insignificant differences in readings between each specimen. Thus, the total volume, alignment and dispersion of PCZs in these precious opal specimens were not sufficient to cause a significant change in thermal conductivity from that of amorphous opal.

Dichroscope

A dichroscopic analysis showed that each specimen was, as expected, synchromatic. Surprisingly, seven of the specimens displayed contra luz when viewed through the dichroscope. Only specimen 1 had no dichroscopic contra luz response. When using the dichroscope to view each specimen in areas actively displaying contra luz, asynchromatic dichroism was observed. Dichroscopic observations of the contra luz property had not been documented previously.

Polariscope

A polariscopic analysis showed that each of the specimens was isotropic. Specimens 5, 7 and 8 were SR. Specimens 1, 2, 3, 4 and 6 were ADR. As expected for each ADR specimen, the orientation of the X-like isogyre figure did not change as each specimen was rotated. ADR was confirmed because no specimens darkened when switching between crossed and aligned polarizers. SR/ADR was further confirmed because significant crystallinity was not supported via RI or thermal conductivity.

Additional Experimental Data

Specimen 1 was the only specimen in which only a portion of the specimen (about half) was precious contra luz opal and the other portion was common opal (no play-of-color and no contra luz). CPP events appeared in the precious opal portion. CPP events did not appear in the common opal portion. Reflected and transmitted PPOI appeared in the common and precious opal portions. Hence, this is evidence that CPP is a property related to ordered microspheres.

Specimens 1 and 4 were the only specimens that displayed asterism, which is a newly discovered property when manifested under monochromatic fiber optic light. Asterism is a rare property for natural opal. Yet, this is the first time that asterism has been documented to occur for opal under monochromatic light.

Specimen 2 displayed a particularly unusual CPP event. This event may have been related to having the strongest CPP and non-CPP contra luz responses under all light sources. In particular, under green fiber optic light, a significant portion of specimen 2 responded as a unified prismatic contra luz, with many CPP events, displaying red closest to the incident PPOI and then progressing through orange, yellow, green, blue and finally violet was located most distally from the incident PPOI. This CPP contra luz response contradicts the common thought that precious opal is comprised of randomly oriented islands of PCZs which lack the ability to exert photonic control over a large, macroscopic volume.

Specimen 3 demonstrated sensitivity to changes in internal $H_2O$ levels. While starting out as transparent, specimen 3 started to become hazy translucent white after only about five minutes of air exposure. Specimen 5 had a similar haze response. Non-CPP play-of-color was minimal at full hydration and became moderately strong after a few minutes of air exposure. Increased haze caused CPP and non-CPP play-of-color events to be more visible due to increased contrast.

For specimen 3, the colors of non-CPP play-of-color were particularly dependent on the angle of incidence. Regardless of the light source, incident light was up or downconverted to display mostly reds/oranges when the angle of incidence approached the perpendicular relative to the viewer and mostly greens/blues when the angle of incidence approached the horizontal relative to the viewer. Furthermore, the proximal side of this specimen had a significantly flatter dome than did the other specimens. Hence, the reflected PPOI propagated at a wider angle, which interfered with the visibility of the reflected PPOI from the incident side.

Specimens 4, 5 and 6 formed a mild haze proximal to the incident PPOI for incident monochromatic fiber optic light sources. This haze was not related to hydration status. In contrast, other specimens that formed non-hydration-related haze and other haze-inducing light sources on specimens 4, 5 and 6, formed haze proximally to the reflected PPOI. Specimen 5 demonstrated sensitivity to changes in internal $H_2O$ levels. This specimen was completely transparent when fully hydrated and started to become hazy translucent white after about four minutes of air exposure. Specimen 3 had a similar haze response. Even so, hydration-related changes in transparency did not appear to affect CPP or non-CPP play-of-color events for specimen 5.

Specimens 5, 6 and 7 demonstrated unusual reflected PPOI events. Reflected PPOI was red orange, not the white reflected PPOI displayed by most of the other specimens. These unusual events were observed under each of the four monochromatic fiber optic sources. Specimen 6 demonstrated a unique sensitivity to changes in internal $H_2O$ levels that were similar to those of specimen 7. While there was no haze response, after a few days of exposure to air, specimen 6 started to respond differently to incident light. For example, under the quad-cluster fiber optic incident light, the specimen did not propagate all four incident wavelengths for transmitted or reflected PPOI. Yet, hydration-related changes did not appear to affect CPP events.

Specimen 7 demonstrated a unique sensitivity to changes in internal $H_2O$ levels that were similar to those of specimen 6. While there was no haze response, after many days of exposure to air, specimen 7 started to respond differently to incident light. For example, under the quad-cluster fiber optics incident light, the specimen did not always propagate incident blue. Instead, the blue incident light was often downconverted to red orange. Furthermore, a portion of the incident blue light was diffused into the large internal photonic glass borders of the PCZs, making them more visible.

Specimen 8 was the only specimen with sub-surface crazing. Some CPP events were observed in reflections off of the internal planes of crazing and overlapping the crazed areas. Crazing did not appear to be a boundary to prevent CPP events. Yet, photonic properties did not always flow past the lines of crazing without distortion.

Early in the research of specimen 8, from certain angles of incidence, the CPP events were observed to align with the oval curvature of the exterior, with differentiated CPP events arranged similarly to the numbers around a clock. The rotations, shapes and polychroic configurations of the CPP events displayed by this specimen made it one of the easiest to observe among the test specimens. However, many months of testing have witnessed progressive crazing. Crazing caused an increase in internal fractures and tiny surface flakes began to dislodge from the specimen. Even with these physical issues, the specimen continued to display CPP events. However, the CPP events no longer assumed a clock-like formation and the strength of clarity, coherence and polychroism decreased substantially.

Compact Fluorescent Light (CFL)

Specimen 1 was transparent. The photonically responsive portion of the specimen was mildly positive for CPP events, negative for contra luz CPP events and strongly positive for play-of-color and contra luz. The non-photonically responsive portion was negative for play-of-color and contra luz. Play-of-color and contra luz had intensely strong color saturation over the entire visible spectrum. Play-of-color and contra luz displayed a few polychromatic columns that could have been CPP but were not distinct enough for positive identification. Incident and reflected PPOI were white.

Specimen 2 was transparent. The specimen was mildly positive for CPP events, negative for contra luz CPP events, positive CPP color transformations, mildly to moderately positive for play-of-color and intensely positive for contra luz. Play-of-color and contra luz had strong to intense color saturation over the entire visible spectrum. Incident PPOI was white and reflected PPOI was pinkish yellow.

Specimen 3 was transparent. The specimen was very mildly positive for CPP events, very mildly positive for contra luz CPP events, positive CPP color transformations for some CPP events, very mildly positive for play-of-color and very mildly positive for contra luz. Play-of-color and contra luz had mild to moderate color saturation over the entire visible spectrum. Incident and reflected PPOI were white.

Specimen 4 was transparent. The specimen was negative for CPP events, negative for contra luz CPP events, very strongly positive for play-of-color and moderately positive for contra luz. Play-of-color and contra luz had mild to very strong color saturation over the entire visible spectrum. Incident PPOI was white and reflected PPOI was light yellow.

Specimen 5 was translucent. The specimen was mildly positive for CPP events, negative for contra luz CPP events, moderately positive for play-of-color and negative for contra luz. Play-of-color had mild to strong color saturation over the entire visible spectrum (mostly green and red), depending on the angle of incidence relative to the viewer. Incident PPOI was white and reflected PPOI was pinkish yellow.

Specimen 6 was transparent. The specimen was mildly positive for CPP events, negative for contra luz CPP events, very strongly positive for play-of-color and mildly positive for contra luz. Play-of-color and contra luz had mild to very strong color saturation over the entire visible spectrum (mostly red and green). Incident PPOI was white and reflected PPOI was yellow.

Specimen 7 was transparent. The specimen was mildly positive for CPP events, negative for contra luz CPP events, positive CPP color transformations, mildly to strongly positive for play-of-color and very mildly positive for contra luz. Play-of-color and contra luz had mild to strong color saturation over the entire visible spectrum (mostly green and red). Incident PPOI was white and reflected PPOI was orange.

Specimen 8 was transparent. The specimen was very strongly positive for CPP events, negative for contra luz CPP events, positive CPP color transformations, formed polychromatic CPP rings, mildly positive for play-of-color and very mildly positive for contra luz. Play-of-color and contra luz had mild to intense color saturation over the entire visible spectrum. Incident and reflected PPOI were white.

LED

Specimen 1 was transparent. The photonically responsive portion of the specimen was moderately positive for CPP events, negative for contra luz CPP events, positive CPP color transformations, strongly positive for play-of-color and strongly positive for contra luz. Play-of-color and contra luz showed intensely strong color saturation, over the entire visible spectrum. Incident and reflected PPOI were white.

Specimen 2 was transparent. The specimen was moderately to strongly positive for CPP events, mildly positive for contra luz CPP events, positive CPP color transformations, mildly to moderately positive for play-of-color and strongly positive for contra luz. Play-of-color and contra luz had moderate to intense color saturation over the entire visible spectrum. The play-of-color and contra luz displayed a few polychromatic columns that appeared to be CPP but were not distinct enough for positive identification. Incident PPOI was white and reflected PPOI was pinkish yellow.

Specimen 3 was transparent. The specimen was negative for CPP events, very mildly positive for contra luz CPP events, positive CPP color transformations, mildly positive for play-of-color and very mildly positive for contra luz. Play-of-color and contra luz had mild to moderate color saturation over the entire visible spectrum. Incident PPOI was white and reflected PPOI was light yellow.

Specimen 4 was transparent. The specimen was strongly positive for CPP events, mildly to moderately positive for contra luz CPP events, positive CPP color transformations, very strongly positive for play-of-color and strongly positive for contra luz. Play-of-color and contra luz had mild to very strong color saturation over the entire visible spectrum. Incident PPOI was white and reflected PPOI was light yellow.

Specimen 5 was translucent. The specimen was moderately to strongly positive for CPP events, negative for contra luz CPP events, moderately positive for play-of-color and negative for contra luz. Play-of-color had moderate to very strong color saturation over the entire visible spectrum. Incident PPOI was white and reflected PPOI was not visible.

Specimen 6 was transparent. The specimen was mildly positive for CPP events, negative for contra luz CPP events, positive CPP color transformations, moderately to strongly positive for play-of-color and very mildly positive for contra luz. Play-of-color and contra luz had mild to very strong color saturation over the entire visible spectrum. Incident PPOI was white and reflected PPOI was yellow.

Specimen 7 was transparent. The specimen was very strongly positive for CPP events, negative for contra luz CPP events, positive CPP color transformations, mildly positive for play-of-color and negative for contra luz. Play-of-color had moderate to very strong color saturation over the entire visible spectrum. Incident and reflected PPOI were white.

Specimen 8 was transparent. The specimen was very strongly to intensely positive for CPP events, negative for contra luz CPP events, positive CPP color transformations, formed polychromatic CPP ring and columns, mildly positive for play-of-color and negative for contra luz. Play-of-color had mild to intense color saturation over the entire visible spectrum. Incident and reflected PPOI were white.

Fiber Optic Cluster, Polychromatic

Specimen 1 was transparent. The photonically responsive portion of the specimen was moderately positive for CPP events, negative for contra luz CPP events, negative CPP color transformations, intensely positive for non-CPP play-of-color and intensely positive for non-CPP contra luz. Play-of-color had moderate to very strong color saturation over the entire visible spectrum. Incident PPOI was white and reflected PPOI was white.

Specimen 2 was transparent. The specimen was very strongly positive for CPP events, moderately positive for contra luz CPP events, positive CPP color transformations, intensely positive for non-CPP play-of-color and intensely positive for non-CPP contra luz. Play-of-color had very to intensely strong color saturation over the entire visible spectrum. Incident PPOI was white and reflected PPOI was red.

Specimen 3 was transparent. The specimen was negative for CPP events, negative for contra luz CPP events, positive CPP color transformations, very strongly positive for non-CPP play-of-color and very strongly positive for non-CPP contra luz. Play-of-color had very strong color saturation over the entire visible spectrum. Incident PPOI was white and reflected PPOI was white.

Specimen 4 was transparent. The specimen was strongly positive for CPP events, moderately positive for contra luz CPP events, positive CPP color transformations, strongly positive for non-CPP play-of-color and strongly positive for non-CPP contra luz. Play-of-color had strong to very strong color saturation over the entire visible spectrum. Incident PPOI was white and reflected PPOI was white.

Specimen 5 was transparent. The specimen was moderately positive for CPP events, negative for contra luz CPP events, negative CPP color transformations, very strongly positive for non-CPP play-of-color and negative for non-CPP contra luz. Play-of-color had very to strong color saturation over the entire visible spectrum. Incident PPOI was white and reflected PPOI was red.

Specimen 6 was transparent with a mild haze. The specimen was moderately positive for CPP events, negative for contra luz CPP events, positive CPP color transformations, very strongly positive for non-CPP play-of-color and negative for non-CPP contra luz. Play-of-color had very to intensely strong color saturation over the entire visible spectrum. Incident PPOI was white and reflected PPOI was red.

Specimen 7 was transparent with a mild white haze. The specimen was very strongly positive for CPP events, negative for contra luz CPP events, positive CPP color transformations, strongly positive for non-CPP play-of-color and negative for non-CPP contra luz. Play-of-color had moderate to very strong color saturation over the entire visible spectrum. Incident PPOI was white and reflected PPOI was white.

Specimen 8 was transparent with a mild white haze. The specimen was very strongly positive for CPP events, negative for contra luz CPP events, negative CPP color transformations, strongly positive for non-CPP play-of-color and negative for non-CPP contra luz. Play-of-color had mildly to intensely strong color saturation over the entire visible spectrum. Incident PPOI was white and reflected PPOI was green.

Fiber Optic Cluster, Quadchromatic

Specimen 1 was transparent. The photonically responsive portion of the specimen was moderately positive for CPP events, mildly positive for CPP contra luz events, positive CPP color transformations, strongly positive for non-CPP play-of-color and strongly positive for non-CPP contra luz. CPP events became strong as PPOI angles approached vertical relative to the viewer. Not limited to its photonically active portion, the specimen faithfully propagated a reflected PPOI of all four wavelengths as the shapes of each fiber in each fiber optic bundle through the distal side. Relative to the incident PPOI, transmitted PPOI was slightly larger, about the same color saturation, no extra spread, and little blur. Transmitted PPOI had the same rotated conformation of the reflected PPOI.

Some of the non-CPP contra luz events of specimen 1 were columnar and may have been CPP events as seen from the side. Some of the contra luz shapes were long polychromatic columnar streams, suggesting that they may have had cross-sections that would have been CPP events. While highly suggestive, the shapes were not distinct enough for certain identification as CPP.

A few of the CPP events for specimen 1 failed to faithfully propagate all four incident colors and, in most cases, failed to propagate the full incident configuration of shapes. Instead, these CPP events appeared to emphasize only one, two or three colors, depending on the angle of incidence. A few of the CPP events showed rotated configurations of groups of three fiber optic clusters that did not match the expected 180° axial rotation of the incident PPOI. In one photo, the main configuration of the CPP events matched a 90° clockwise rotation of the reflected PPOI.

Specimen 2 was transparent. The specimen was very strongly positive for CPP events, very mildly positive for CPP contra luz events, positive CPP color transformations, mildly positive for non-CPP play-of-color and very strongly positive for non-CPP contra luz. The specimen faithfully propagated all four wavelengths as blurry shapes of each fiber optic bundle through the distal side. Relative to the incident PPOI, transmitted PPOI was a little larger, with about the same color saturation, extra spread, and moderate blur. Transmitted PPOI had the same rotated conformation as reflected PPOI.

Some of the CPP events of specimen 2 had milder color saturation, increased spread and increased blur. Some of the CPP events failed to faithfully propagate all four incident wavelengths. The specimen displayed some CPP events in which all incident PPOI was converted to red, others converted to blue and green, and others converted to blue only. Yet, the majority of these CPP events did not involve a conversion of wavelengths. Generally, the CPP events did not match the expected 180° rotation of the incident PPOI, which shows that rotation can be a controlled variable. One photo showed that the main CPP events sometimes matched a 180° rotation of the reflected PPOI.

Specimen 3 was transparent. The specimen was extremely mildly positive for CPP events, negative for CPP contra luz events, negative CPP color transformations, positive for non-CPP play-of-color and extremely mildly positive for non-CPP contra luz. The specimen faithfully propagated all four wavelengths as the shapes of each fiber optic bundle through the distal side. Relative to the incident PPOI, transmitted PPOI was a little larger, with about the same color saturation, no extra spread, and little blur. Transmitted PPOI had the same rotated conformation as reflected PPOI.

Specimen 4 was transparent. The specimen was very strongly positive for CPP events, very strongly positive for CPP contra luz events, positive CPP color transformations, negative for non-CPP play-of-color, and moderately positive for non-CPP contra luz. The specimen faithfully propagated all four wavelengths as the shapes of each fiber optic bundle through the distal side. Relative to the incident PPOI, transmitted PPOI was a little larger, with about the same color saturation, no extra spread, and little blur. Transmitted PPOI had the same rotated conformation as reflected PPOI.

Specimen 4 had numerous CPP events, milder color saturation, increased spread and increased blur. Most of the CPP events failed to faithfully propagate all four incident colors. The specimen displayed CPP events in which all or a portion of the incident PPOI were converted to one or more colors. Mostly, the CPP events did not match the expected 180° rotation of the incident PPOI. Surprisingly, a few CPP events had 90° horizontal clockwise and counterclockwise axial rotations of the reflected PPOI.

Specimen 5 was transparent. The specimen was strongly positive for CPP events, mildly positive for CPP contra luz events, positive CPP color transformations, very mildly positive for non-CPP play-of-color and negative for non-CPP contra luz. Related to its hydration sensitivity, CPP contra luz was only visible for a couple of minutes after air exposure and non-CPP play-of-color was very mild at full hydration and became moderately strong over about four minutes of air exposure. The specimen faithfully propagated all four wavelengths as the shapes of each fiber optic bundle through the distal side. Relative to the incident PPOI, the transmitted PPOI was a little larger, with about the same color saturation, no increased spread, and very little blur. Transmitted PPOI had the same rotated conformation as reflected PPOI.

Specimen 6 was transparent. The specimen was moderately positive for CPP events, negative for CPP contra luz events, positive CPP color transformations, strongly positive for non-CPP play-of-color and negative for non-CPP contra luz. The specimen faithfully propagated all four wavelengths as the shapes of each fiber optic bundle through the distal side. Relative to the incident PPOI, transmitted PPOI was a little larger, with about the same color saturation, no extra spread, and very little blur. Transmitted PPOI had the same rotated conformation as reflected PPOI.

After a few days of exposure to air, specimen 6 did not faithfully propagate all four incident wavelengths. At many angles of incidence, all incident PPOI colors were converted to red orange. The specimen faithfully propagated the shapes of each fiber in each fiber optic bundle for reflected PPOI.

Specimen 7 was transparent. The specimen was moderately positive for CPP events, negative for CPP contra luz events, negative CPP color transformations, moderately positive for non-CPP play-of-color and negative for non-CPP contra luz. CPP events ranged from mild to moderate in strength and often propagated and/or converted incident PPOI to be green. When observable, the specimen faithfully propagated all four wavelengths as the shapes of each fiber optic bundle through the distal side. Relative to the incident PPOI, the transmitted PPOI propagation was a little larger, with about the same color saturation, no extra spread, and very little blur. Transmitted PPOI had the same rotated conformation as reflected PPOI. Incident and reflected PPOI events were not always clearly visible. Propagation and CPP distortions occurred when incident PPOI intersected with one of the facets. Hence, determining symmetry and rotation of reflected PPOI was difficult at all angles of incidence.

Occasionally, after many days of exposure to air, specimen 7 did not propagate incident blue. Instead, the blue incident light was downconverted to red orange. Also, a portion of the blue light has diffused into the large internal photonic glass borders, making them more visible. Regardless of hydration status, these photonic glass borders did not appear to affect the formation of play-of-color or CPP events.

Specimen 8 was transparent. The specimen was very strongly positive for CPP events, negative for CPP contra luz events, positive CPP color transformations, negative for non-CPP play-of-color and extremely mildly positive for non-CPP contra luz. The specimen did not faithfully propagate all four wavelengths and shapes of each fiber optic bundle through the distal side. Instead, the significantly diminished amount of light transmitted by this specimen was a dim, blurry red yellow smudge. The blur was so significant that it was unable to be determined if the transmitted PPOI propagation had the same rotated conformation of the reflected PPOI.

Early in this research, the milder internal crazing of specimen 8 did not appear to interfere with CPP events. This specimen displayed numerous CPP events with moderate to strong color saturation, increased spread and mild to moderate blur. The specimen demonstrated a strong tendency to form polychromatic CPP rings. Often, these rings distributed each bundle of color in polychromatic CPP rings. The specimen displayed CPP events in which all or a portion of the incident PPOI were converted to one or more colors that included red, orange, yellow, green, blue and violet. Many of the CPP events did not appear to match the expected 180° rotation of the incident PPOI. Sometimes, the rotations of the color bundles appeared to align in arcs resembling the surface curvature of the specimen.

Fiber Optic Cluster, Monochromatic

Specimen 1. Under blue fiber optic light specimen 1 was transparent. This specimen was very mildly positive for CPP, mildly positive for non-CPP play-of-color, strongly positive for CPP contra luz and mildly positive for non-CPP contra luz when the PPOI angle of incidence was almost perpendicular to the viewer. When the incident light impacted the specimen at angles greater than about 30°, relative to the viewer, the specimen started to display a translucent blue/blue-green haze proximal to the reflected PPOI. CPP events included red, green and blue. This specimen displayed photonic downconversion.

Under green fiber optic light, specimen 1 was transparent and became increasingly translucent bluish green as the strength of the incident PPOI increased. This specimen was mildly to moderately positive for CPP, very mildly positive non-CPP play-of-color, moderately positive for CPP contra luz and mildly positive for non-CPP contra luz. CPP events included green, red, blue and violet. The specimen formed poly and monochromatic CPP columns. This specimen displayed photonic upconversion and downconversion.

Under yellow fiber optic light, specimen 1 was transparent. This specimen was strongly positive for CPP, negative for non-CPP play-of-color, mildly to moderately positive for CPP contra luz and moderately to intensely positive for an unusual non-CPP contra luz. As the angle of incidence approached being nearly parallel with the table of the specimen, this specimen displayed a mild white haze and rare asterism proximal to the reflected PPOI. This specimen had many contra luz events with propagated shapes that were suggestive of CPP, covering the visible spectrum. Some of the contra luz shapes may have been CPP events viewed from the side, such that the contra luz shapes were long polychromatic streams with cross-sections that may have revealed themselves to be CPP events had they been viewed in cross-section. Not all of the shapes were clear enough for positive identification as CPP events. CPP events included red, green and violet. This specimen displayed photonic upconversion and downconversion.

Under red fiber optic light, specimen 1 was transparent blue proximal to reflected PPOI and transitioned to transparent red distal to reflected PPOI. When the incident light impacted the specimen at angles greater than about 30°, relative to the viewer, the specimen started to display a translucent bluish white haze and rare asterism proximal to the reflected PPOI. The haze and asterism had a positive correlation with the strength of the incident light. Specimen was strongly positive for CPP, negative for non-CPP play-of-color, mildly positive for CPP contra luz and strongly positive for an unusual non-CPP contra luz. Specimen 1 had many contra luz events with propagated shapes that were suggestive of CPP, with colors that included red, blue, green and yellow. Some of the contra luz shapes may have been CPP events viewed from the side, such that the contra luz shapes were long polychromatic streams with cross-sections that may have revealed themselves to be CPP events had they been viewed in cross-section. Yet, not all of the shapes were clear enough for positive identification as CPP events. CPP events included red, blue and green. This specimen displayed photonic upconversion.

Specimen 2. Under blue fiber optic light, specimen 2 was transparent. This specimen was moderately positive for CPP, strongly positive for non-CPP play-of-color, negative for CPP contra luz and moderately positive for non-CPP contra luz. Even though most of the contra luz play-of-color was non-CPP, some of the contra luz events had shapes that were suggestive of CPP, with colors that included red, green and blue. However, the shapes were not distinct enough for positive identification as CPP. CPP events were mostly red, green, blue and violet. Reflected PPOI displayed the typical photonic symmetry transformation from incident PPOI in addition to a unique 90° axillary rotation of the reflected PPOI, such that two of the three reflected dots overlapped the typical reflected PPOI. This specimen displayed photonic downconversion.

Under green fiber optic light, specimen 2 was transparent blue. This specimen was mildly positive for CPP, strongly positive for non-CPP play-of-color, moderately positive for CPP contra luz and strongly positive for non-CPP contra luz. This specimen displayed translucent blue/blue-green haze proximal to the reflected photonic PPOI. CPP events included red, orange, yellow, green, blue and violet. The specimen formed polychromatic CPP columns. A significant portion of the specimen responded as a unified prismatic contra luz, with many CPP events, displaying red closest to the PPOI and then progressing through orange, yellow, green, blue and finally violet most distally from the incident PPOI. Thus contradicting the common thought that precious opal is comprised of randomly oriented islands of pseudo-crystallinity that lack the ability to exert photonic control over a large, macroscopic volume. The reflected PPOI displayed the typical rotational symmetry transformation of the incident PPOI in addition to a mirror of the reflected PPOI, such that one of the three reflected dots overlapped the typical reflected PPOI. This specimen displayed photonic upconversion and downconversion.

Under yellow fiber optic light, specimen 2 was transparent. This specimen was mildly to strongly positive for CPP, mildly to strongly positive for non-CPP play-of-color, strongly positive for CPP contra luz and moderately positive non-CPP contra luz and displayed a very mild white haze proximal to the reflected photonic PPOI. CPP events included red, orange, yellow, green, blue and violet. Reflected PPOI displayed the typical rotational symmetry transformation from incident PPOI in addition to a mirror of the reflected PPOI, such that one of the three reflected dots overlapped the typical reflected PPOI. This specimen displayed photonic upconversion and downconversion.

Under red fiber optic light, specimen 2 was transparent. This specimen was mildly to moderately positive for CPP, mildly to strongly positive for non-CPP play-of-color, mildly positive for CPP contra luz and strongly positive for non-CPP contra luz. CPP events included red, orange, yellow, green and blue. Reflected PPOI displayed the typical rotational symmetry transformation from incident PPOI in addition to a mirror of the reflected PPOI, such that one of the three reflected dots overlapped the typical reflected PPOI. This specimen displayed photonic upconversion.

Specimen 3. Under blue fiber optic light, specimen 3 was hazy translucent blue. This specimen was moderately positive for CPP, strongly positive for non-CPP play-of-color, negative for CPP contra luz and negative for non-CPP contra luz. CPP events included red, orange, green and blue. This specimen displayed photonic downconversion.

Under green fiber optic light, specimen 3 was hazy translucent greenish blue. This specimen was moderately to strongly positive for CPP, moderately to strongly positive for non-CPP play-of-color, negative for CPP contra luz and negative for non-CPP contra luz. CPP events included red, orange, green and blue. This specimen displayed photonic upconversion and downconversion.

Under yellow fiber optic light, specimen 3 was hazy translucent white. This specimen was mildly positive for CPP, strongly positive for non-CPP play-of-color, negative for CPP contra luz and negative for non-CPP contra luz. CPP events included red, orange, yellow, green, blue and violet. This specimen displayed photonic upconversion and downconversion.

Under red fiber optic light, specimen 3 was transparent with a red haze when the incident light was brightest and/or almost perpendicular to the table of the specimen and a blue haze when the incident light was almost parallel with the table of the specimen. This specimen was mildly positive for CPP, strongly positive for non-CPP play-of-color, negative for CPP contra luz and negative for non-CPP contra luz. CPP events included red, green and blue. Also, this specimen displayed play-of-color in shapes that were suggestive of CPP. However, these shapes were not distinct enough for positive identification as CPP. Reflected PPOI displayed the typical rotational symmetry transformation from incident PPOI, in addition to a mirror of the reflected PPOI, such that one of the three reflected dots overlapped the typical reflected PPOI. This specimen displayed photonic upconversion.

Specimen 4. Specimen 4 had a rare asterism and an unusual haze response to incident light. The only other specimen to display asterism was specimen 1. This specimen formed a mild haze proximal to the incident PPOI for the green incident monochromatic fiber optic light source.

Under blue fiber optic light, specimen 4 was transparent with a slight blue haze proximal to the reflected PPOI, which strengthened as the angle of incidence increased relative to the viewer. This specimen was moderately positive for CPP, mildly positive for non-CPP play-of-color, negative for CPP contra luz and negative for non-CPP contra luz. CPP events included red, green, blue and violet. The specimen formed CPP columns, one polychromatic and one monochromatic with rare asterism. This specimen displayed photonic downconversion.

Under green fiber optic light, specimen 4 was transparent with a mild blue-green haze proximal to the incident PPOI that strengthened as the angle of incidence increased relative to the viewer. This specimen was moderately positive for CPP, mildly positive for non-CPP play-of-color, negative for CPP contra luz and negative for non-CPP contra luz. CPP events included red, yellow, green, blue and violet. The specimen formed a polychromatic ring of CPP events. This specimen displayed photonic upconversion and downconversion.

Under yellow fiber optic light, specimen 4 was transparent with mild white haze proximal to the reflected PPOI that strengthened as the angle of incidence increased relative to the viewer. This specimen was strongly positive for CPP, moderately positive for non-CPP play-of-color, negative for CPP contra luz and negative for non-CPP contra luz. CPP events included red, orange, yellow, green, blue and violet. The specimen formed polychromatic columns and rings of CPP events. Also, the reflected PPOI displayed the typical rotational symmetry transformation from incident PPOI in addition to a mirror of the reflected PPOI, such that one of the three reflected dots overlapped the typical reflected PPOI. This specimen displayed photonic upconversion and downconversion.

Under red fiber optic light, specimen 4 was transparent. This specimen was moderately positive for CPP, mildly positive for non-CPP play-of-color, negative for CPP contra luz and negative for non-CPP contra luz. CPP events included red, orange, green, blue and violet. The specimen formed a polychromatic ring of CPP events and another observation showed the specimen forming a polychromatic column of CPP events. This specimen displayed photonic upconversion.

Specimen 5. The reflected PPOI was red orange. This unusual effect was observed under each of the four monochromatic fiber optic sources. The specimen had an especially strong CPP presence.

Under blue fiber optic light, specimen 5 was translucent blue with blue haze strongest proximal to the incident PPOI. This specimen was moderately positive for CPP, moderately positive for non-CPP play-of-color, negative for CPP contra luz and very mild for non-CPP contra luz. Yet, some contra luz events propagated shapes that were suggestive of CPP. However, the shapes were not distinct enough for positive identification. CPP events included red, green, blue and violet. This specimen displayed photonic downconversion.

Under green fiber optic light, specimen 5 was transparent and became increasingly translucent greenish blue and bluish violet as the angle of incidence approached alignment with the angle of the viewer. This specimen was mildly to moderately positive for CPP, moderately to strongly positive for non-CPP play-of-color, negative for CPP contra luz and negative for non-CPP contra luz. CPP events included red, orange, yellow, green, blue and violet. The specimen formed a polychromatic column of CPP events and displayed photonic upconversion and downconversion.

Under yellow fiber optic light, specimen 5 was translucent greenish yellow with a white haze. This specimen was mildly to strongly positive for CPP, mildly to strongly positive for non-CPP play-of-color, negative for CPP contra luz and negative for non-CPP contra luz. CPP events included red, orange, yellow, green, blue and violet. The specimen formed a polychromatic ring of CPP events and displayed photonic upconversion and downconversion.

Under red fiber optic light, specimen 5 was translucent bluish red with a white haze. This specimen was mildly to strongly positive for CPP, mildly to strongly positive for non-CPP play-of-color, negative for CPP contra luz and negative for non-CPP contra luz. CPP events included red, orange, yellow, green, blue and violet. The specimen formed a polychromatic ring of CPP events and displayed photonic upconversion.

Specimen 6. The reflected PPOI was red orange, not the white reflected PPOI that was displayed by most of the other specimens. This unusual effect was observed under each of the four monochromatic fiber optic sources. Under blue, green and red fiber optic light, specimen 6 formed a mild haze that was strongest proximal to the incident PPOI. The specimen had a mildly to moderately strong CPP presence.

Under blue fiber optic light, specimen 6 was transparent blue with a blue-green haze that was strongest proximal to the incident PPOI. This specimen was moderately positive for CPP, strongly positive for non-CPP play-of-color, negative for CPP contra luz and negative for non-CPP contra luz. CPP events included red, green, blue and violet. This specimen displayed photonic downconversion.

Under green fiber optic light, specimen 6 was translucent bluish green with a bluish green haze that was strongest proximal to the incident PPOI. This specimen was mildly to moderately positive for CPP, mildly to strongly positive for non-CPP play-of-color, negative for CPP contra luz and negative for non-CPP contra luz. CPP events included red, orange, green and blue. This specimen displayed photonic upconversion and downconversion.

Under yellow fiber optic light, specimen 6 was hazy translucent greenish white. This specimen was mildly positive for CPP, strongly positive for non-CPP play-of-color, negative for CPP contra luz and negative for non-CPP contra luz. CPP events included red, orange, yellow, green, blue and violet. This specimen displayed photonic upconversion and downconversion.

Under red fiber optic light, specimen 6 was translucent bluish red with a white haze that was strongest proximal to the incident PPOI. This specimen was mildly positive for CPP, strongly positive for non-CPP play-of-color, negative for CPP contra luz and negative for non-CPP contra luz. CPP events included red, orange, yellow, green, blue and violet. This specimen displayed photonic upconversion.

Specimen 7. Specimen 7 was unusual in that it appeared to be a natural macro representation of a typically invisible photonic behavior of precious opal. Specifically, in addition to expected PCZs, this specimen appeared to have large PCZs with unusually distinct and noticeably thick photonic glass boundaries around some of the PCZs. In typical precious opal, individual PCZs in a typical precious opal are only visible when actively displaying play-of-color because the photonic glass boundaries are not otherwise readily identifiable. As expected, non-CPP events were constrained to individual PCZs. While the PCZs were observed to interfere with the formation of some CPP events, CPP events were not constrained to individual PCZs.

The reflected PPOI for this specimen was red orange, as opposed to the white reflected PPOI that was displayed by most of the other specimens. This unusual effect was observed under each of the four monochromatic fiber optic sources for this specimen. The specimen had a surprisingly strong CPP presence.

Under blue fiber optic light, specimen 7 was transparent blue and reddish purple with a blue haze that was strongest proximal to the incident PPOI. This specimen was mildly positive for CPP, strongly positive for non-CPP play-of-color, negative for CPP contra luz and negative for non-CPP contra luz. CPP events included red, yellow, green and blue. The specimen formed a partial polychromatic ring of CPP events and displayed photonic downconversion.

Under green fiber optic light, specimen 7 was transparent green with a blue-green haze that was thickest proximal to the incident PPOI. This specimen was mildly positive for CPP, mildly to strongly positive for non-CPP play-of-color, negative for CPP contra luz and negative for non-CPP contra luz. CPP events included red, green and blue. Non-CPP events were mostly red, green and blue. This specimen displayed photonic upconversion and downconversion.

Under yellow fiber optic light, depending on the intensity and angle of incident light, specimen 7 was transparent greenish yellow or pinkish orange with a greenish yellow haze that was strongest along the PCZ boundaries. This specimen was mildly to very strongly positive for CPP, mildly to very strongly positive for non-CPP play-of-color, negative for CPP contra luz and negative for non-CPP contra luz. CPP events included red, orange, yellow, green, blue and violet. The specimen formed multicolor rings of CPP events and displayed photonic upconversion and downconversion.

Under red fiber optic light, specimen 7 was transparent reddish blue with bluish orange haze. This specimen was mildly to strongly positive for CPP, mildly to strongly positive for non-CPP play-of-color, negative for CPP contra luz and negative for non-CPP contra luz. CPP events included red, orange, yellow, green and blue. The specimen formed a polychromatic ring of CPP events and displayed photonic upconversion.

Specimen 8. Under blue fiber optic light, specimen 8 was transparent blue with reddish purple haze. This specimen was mildly positive for CPP, mildly positive for non-CPP play-of-color, negative for CPP contra luz and negative for non-CPP contra luz. CPP events included red, blue and violet. This specimen displayed photonic upconversion.

Under green fiber optic light, specimen 8 was transparent bluish green with mild bluish green haze that was strongest proximal to the incident PPOI. This specimen was mildly to moderately positive for CPP, mildly to moderately positive for non-CPP play-of-color, negative for CPP contra luz and negative for non-CPP contra luz. Also, this specimen displayed play-of-color in shapes that were suggestive of CPP. However, these shapes were not distinct enough for positive identification as CPP. CPP events included orange, blue and violet. The specimen formed rows of monochromatic columns of CPP events and displayed photonic upconversion and downconversion.

Under yellow fiber optic light, specimen 8 was transparent yellow orange with a mild orange white haze that was strongest proximal to the incident PPOI. This specimen was moderately to strongly positive for CPP, very mildly positive for non-CPP play-of-color, negative for CPP contra luz and negative for non-CPP contra luz. CPP events included red, orange, yellow, green, blue and violet. This specimen formed rings of polychromatic CPP events and displayed photonic upconversion and downconversion.

Under red fiber optic light, specimen 8 was transparent reddish orange with mild bluish violet haze that was strongest proximal to the incident PPOI. This specimen was moderately to strongly positive for CPP, mildly to moderately positive for non-CPP play-of-color, negative for CPP contra luz and negative for non-CPP contra luz. CPP events included red, orange, yellow, green, blue and violet. This specimen formed polychromatic rings of CPP events and displayed photonic upconversion.

Spectrophotometer

A total of four spectrophotometric scans were done on each specimen. Each specimen was oriented differently for each of the scans. Generally, each scan showed a negative correlation with absorption wavelength. Many of the scans appear to display active play-of-color, contra luz and/or CPP events, which had not been spectrophotometrically documented previously.

Specimen 1. The structures of all four scans were very similar to each other. Almost all of the scan differences were in the overall magnitudes of absorption levels. Scans 2 and 3 were so similar, even in magnitude, that they were practically overlapping. All scans showed an almost identical absorption peak system. An absorption peak showed from 1100 to about 1090 nm, with a maximum peak at 1095 nm and minimum at 1088 nm. The absorption levels showed a steady incline to 850 nm where there was a step down. After the step down, the absorption line resumed its prior slope. A difference was displayed in scan 3 with the presence of a mild peak from 750 to 624 nm. From 624 to 586 nm, all of the scans showed unchanged continuations of the respective absorption lines. Yet, scans 1 and 4 showed a negative slope from 600 to 586 nm. All of the scans showed a step up at 586 nm. The 586 nm step up for scans 1, 2 and 4 seemed to put the absorption scan values where they would have been had the step down at 850 nm not occurred. However, the 586 nm step up for scan 3 marked the beginning of a more rapidly increasing absorption than it had before the step. Scan 4 showed the strongest increase in slope steepness from 586 to 450 nm, relative to the other scans. At about 450 nm was a step down for all scans. Scans 1 and 4 showed a continuation of increasingly steep absorption slopes, relative to the other scans, from 450 to 340 nm, while scans 2 and 3 continued at an unchanged slope. At 340 nm was a step down for all scans. From 340 to 320 nm the absorption assumed a negative slope, which was the only portion of the scan to show a negative slope for all scans.

Specimen 2. The structures of all four scans had strong similarities to each other. The majority of the scan differences were in the overall magnitudes of absorption levels. Even so, each scan had different initial spectrophotometric profiles. Generally, each scan showed a negative correlation with absorption wavelength. Scan 1 had a peak from 1100 to 1085 nm with a small shoulder peak at 1095 nm. Scan 2 had the same general profile as scan 1. However, scan 2 showed a peak at 1100 nm with lower absorption relative to the same peak in scan 1. Scan 3 had a shoulder peak at 1095 nm. However, scan 3 had no peak at 1100 nm. Scan 3 had a gentle peak from 1030 to 995 nm, another gentle peak from 740 to 670 nm and an unevenly increasing rate of absorption from 586 to 450 nm. Scan 4 had the same peak system as scan 1. However, scan 4 had a broad shoulder peak from 1085 to 1030 nm.

Specimen 3. Comparing the structures of the scans to one another, each scan had differences in absorption profiles. The majority of the scan differences were in the overall magnitudes of absorption levels. Scan 1 showed a negative peak system from 1100 to 1092 nm. The slope of scan 1 showed barely increasing absorption levels until 702 nm that was disturbed only by a barely noticeable step down at 850 nm and a very gentle peak at 960 nm. At 702 nm, the rate of absorption increased. A gentle peak was observed from 650 to 586 nm with a maximum peak at 620 nm. At 586 nm was a small step up. From 586 to 340 nm, the rate of absorption increased as a concave curve with another very small step down at 450 nm. The concave curve resembled an exponentially increasing curve with a maximum peak at 340 nm. A convex decreasing slope was observed from 340 to 320 nm. Scan 2 showed a peak system from 1100 to 1072 nm with shoulder peaks at 1092 and 1080 nm. The rest of scan 2 resembled scan 1. However, scan 2 had no steps at 850 or 450 nm.

While scan 3 resembled scan 1, there were some notable differences. Scan 3 showed a stronger, but similarly shaped, initial negative peak system as was seen in scan 1. Significant differences with scan 3 included a step up at 850 nm, step down at 586 nm and step up at 450 nm. Additionally, the curve leading to the peak maximum at 620 nm was more smoothly convex. Furthermore, the curve leading to the peak at 340 nm was more textured and not as high relative to the initial curve values at 1100 nm. Scan 4 resembled scan 2. However, scan 4 had no peak system at 1100 to 1072 nm and a slight step up at 850 nm.

Specimen 4. Each of the four scans showed many commonalities in absorption profiles. The majority of the scan differences were in the overall magnitudes of absorption levels. Scans 1 and 4 were especially similar to each other and scans 2 and 3 were especially similar to each other. Each of the 4 scans showed peak systems from 1100 to 1090 nm, steps up at 586 nm, steps down at 450 nm and steps down at 340 nm. Scans 1 and 4, as well as scans 2 and 3, were each similar pairs regarding overall magnitudes of absorption. Peak and slope structures of scans 1 and 4, as well as scans 2 and 3, were very similar to each other over 450 to 320 nm. Scans 1 and 4 resembled scans for specimen 3 over 586 to 320 nm, although not as steep. Scan 1 had stronger peak structure at 1100 to 1090 nm than did scan 4. Scan 3 showed a strong peak system from 1100 to 1080 nm with a slight shoulder peak at 1092 nm. Scans 2 and 3 had steps down at 360 nm, whereas scans 1 and 4 did not. Scans 1 and 4 showed overall greater increases in absorption, as well as magnitudes of absorption, relative to scans 2 and 3.

Specimen 5. Each of the four scans were significantly different from one another. The majority of the scan differences were in the overall absorption peak structures. Scan 1 showed a negative peak system from 1100 to 1092 nm. Absorption increases were fairly flat from 1092 to 850 nm. There was a step down at 850 nm. After 850 nm, the rate of absorption increased until reaching a peak at 520 nm. The peak at 520 nm had two very mild shoulders at 560 and 546 nm, followed by a rapid decline in absorption until 490 nm. From 490 to 468 nm, there was a convex shaped rapidly declining absorption profile. From 468 to 340 nm, a jagged peak system was shown with a maximum at 340 nm. The jagged peak system had shoulder peaks at 465, 450, 425 and 410 nm. There was a very large step down at 340 nm, followed by a negative slope to 320 nm.

Scan 2 was similar to scan 1 from 1100 to 600 nm. However, scan 2 had greater overall absorption levels than did scan 1. A peak was shown at 600 nm with a shoulder peak at 595 nm. Furthermore, the rate of absorption assumed a sharply increasing slope leading to a set of double peaks at 500 and 490 nm with a shoulder peak at 530 nm. A sharp decline in slope was shown at 468 nm, followed by a jagged peak system with an increased rate of absorption that maximized at 340 nm. A shoulder peak was observed at 440 nm. The wavelength range from 340 to 320 nm was similar to scan 1.

Scan 3 resembled scan 3 of specimen 4. An exceptionally high peak at 1100 nm with a shoulder peak at 1095 nm and tiny secondary shoulder peak at 1080 nm were observed for both scans. Scan 3 showed a barely-there step down at 850 nm, step up at 586 nm, step down at 450 nm and an overall low rate of absorption.

Scan 4 showed a slightly negative peak system from 1100 to 1092 nm. A large step up at 1010 was shown, followed by declining absorption that was slightly convex until 660 nm. After 660 nm, the absorption gently increased until a step up at 450 nm. The wavelength range from 340 to 320 nm was similar to scan 1.

Specimen 6. Each of the four scans had significant differences from one another. Scan 1 had a negative peak system from 1100 to 1092 nm. Then, the absorption slope increased sharply at 1092 nm until a small plateau that ended at a step up at 1060 nm. After the step up, the slope showed a gently increasing absorption to a maximum peak at 950 nm. After 950 nm, the slope started a mildly convex slope contour that started increasing at 858 nm. After a tiny step up at 850 nm, the absorption assumed a rapidly increasing rate of absorption until a jagged peak system from 420 to 340 nm. Shoulder peaks of the increasing slope showed at 585, 520, 480 nm. The jagged peak system had shoulder peaks at 370 and 350 nm. There was a very large step down at 340 nm, which was followed by a negative slope to 320 nm. Scan 2 was similar to scan 1. However, scan 2 did not have a plateau or step up at 1060 nm. In further contrast to scan 1, scan 2 had a tiny step down at 850 nm and shoulder peaks at 610, 575, 535, 500 and 450 nm. Scan 3 resembled scan 3 of specimen 5. However, scan 3 of this specimen had a milder shoulder peak at 1095 nm. Scan 4 resembled scan 3. However, scan 4 had less pronounced overall absorption levels from 1100 to 1092 nm and the peak at 1092 nm was higher.

Specimen 7. Each of the four scans had significant differences from one another. Scan 1 showed a positive peak system from 1100 to 1092 nm with a slightly increasing absorption from 1092 until 850 nm with a small peak at 960 nm and a step up at 850 nm. From 850 nm, the rate of increasing absorption increased until a peak at 550 nm. There were mild shoulder peaks at 660, 580 and 530 nm. A rapidly increasing absorption rate and jagged peak system showed from 500 to 340 nm with had main peaks at 460, 390, 380 and 340 nm. There was a large step down at 340 nm, followed by a negative slope to 320 nm. Scan 2 showed a strong negative peak starting at 1100 nm with a shoulder peak at 1092 nm. From 1092 to 546 nm, the slowly increasing absorption rate was similar to scan 1. After a peak at 546 nm, there was a sharp increase in absorption. Dual peaks showed at 520 and 495 nm. Furthermore, a jagged peak system showed with main peaks at 370 and 340 nm. The wavelength range from 340 to 320 nm was similar to scan 1. Scan 3 resembled scan 3 of specimen 6. However, the peak system for scan 3 of this specimen was wider from 1100 to 1070 nm and the overall absorption is lower than it was over the same range for specimen 6. Scan 4 shows a negative peak system from 1100 to 1092 nm. The absorption level increased gently until 850 nm. There was a very mild peak at 960 nm, followed by a step up at 850 nm. After 850 nm, the rate of absorption increased until a step up at 600 nm, followed by a rapid increase in absorption to a peak at 520 nm. From 520 to 340 nm, a jagged peak system showed with a significant peak at 390 nm. The wavelength range from 340 to 320 nm for scans 1, 2 and 4 were similar to one another.

Specimen 8. Each of the four scans were different from one another. Each of the 4 scans showed a large step down at 340 nm, followed by a negative slope to 320 nm. Scan 1 showed a negative peak at 1092 nm with a moderately increasing absorption to a mild peak at 960 nm, followed by a very small step up at 850 nm. After the step up, absorption increased gently until 730 nm where there was a rapidly increasing rate of absorption until and through the jagged peak system. There were rounded shoulder peaks at 560 and 550 nm, plus a negative shoulder peak at 530 nm. The jagged peak system showed from 546 to 340 nm, with main peaks at 485, 450, 390 and 360 nm and a shoulder peak at 475 nm.

There was a large step down at 340 nm, followed by a negative slope to 320 nm. Scan 2 resembled scan 1 in overall appearance. However, some details differed. Scan 2 shows a small peak at 1100 to 1090 nm, with plateaued absorption until mild peaks at 960 and 936 nm. After 936 nm, a gently increasing absorption was observed until a small peak at 625 nm. After 625 nm, rapidly increasing absorption was observed, followed by a jagged peak system. There was a small peak at 570 nm. The jagged peak system had main peaks at 530, 500, 460, 390 and 360 nm, with shoulders at 495, 475, 445 and 430 nm.

There was a large step down at 340 nm, followed by a negative slope to 320 nm. Scan 3 had a tiny negative peak at 1100 nm, which was followed by a mildly convex overall absorption. There were small steps up at 850, 445 and 370 nm, plus a step down at 340 nm. There was a large step down at 340 nm, followed by a negative slope to 320 nm. Scan 4 had a small negative peak at 1100 to 1092 nm with a gently increasing absorption until 624 nm. The rate of increase was interrupted by a mild peak at 960 nm and a step up at 850 nm. After 624 nm, there was a significantly increasing rate of absorption, including a jagged peak system. There was a triple peak from 480 to 450 nm, single peaks at 485, 385 and 360 nm, and a step down at 340 nm.

Polariscope

Specimens 1, 4 and 6 displayed unmoving isogyres. Specimen 4 showed a line-shaped isogyre. Specimens 1 and 6 displayed X-like isogyres. For specimen 6, at every ½ rotation, the isogyres would part slightly to transform the X-shape into two arched isogyres. At each ½ rotation, the separated isogyres formed arches in alternating directions (on a map, the arches formed in NE/SW and then in NW/SE). The isogyres for each of these three specimens remained visible throughout a 360° rotation.

Specimen 2 showed unmoving X-like and band-shape isogyres that alternating appearing every ¼ revolution. The isogyres did not flow over the specimen, but appeared and disappeared. When the isogyres were not present, the specimen showed a patchwork of many colors due to strain.

Specimen 3 formed crossed isogyres every ¼ rotation. At every ½ rotation, the isogyres would part slightly transform the X-shape into two arched isogyres. At each ½ rotation, the separated isogyres formed arches in alternating directions (on a map, the arches formed in NE/SW and then in NW/SE).

Of the (non-ADR) SR specimens, strain was observed for specimens 5 and 8. Strain caused discoloration to appear under crossed polarizers. Specimen 5 had a vivid blue band-shape that resembled a blue isogyre appeared every ¼ rotation. In between the ¼ rotations, the blue band divided and flowed to cover the narrow ends of the specimen. Specimen 8 showed a mild patchwork of colors due to strain and crazing.

Specimen 7 had false ADR polariscopic behavior because of faceting. Although specimen 7 was SR, it showed a polariscopically unique response, compared to the other specimens. Specimen 7 was the only specimen with opposing facets and, thereby, not strictly cabochon shaped. As the specimen was rotated, dominance alternated between displaying an X-like figure and polychromatic shapes. This dominance trade-off occurred because the polariscopic light source reflected off of each pair of opposing facets as the specimen was rotated to match maximum misalignment of the polar filters. The misalignment caused the reflected light between opposing facets to be unable to pass to the viewer, which caused the appearance of an X-like figure for this specimen. Specimen 8 remained brightly lit throughout a 360° revolution with strain discolorations and no isogyres.

Similar anomalous polariscopic responses have been known to appear for isotropic materials experiencing internal strain. Strained isotropic specimens may polariscopically display polychroism and/or X-like figures. For a strained isotropic specimen, such an X-like figure would appear to flow over and rotate with the specimen while it is rotated with polar filters kept at maximum occlusion. However, for the present research, the orientations of the X-like figures remained orientationally fixed and did not rotate as the specimens were rotated. Furthermore, none of the X-like figures flowed over the surfaces of the specimens. Instead, the figures either remained present throughout the rotation or they faded and reappeared every partial turn. The cause of the anomalous polariscopic response for these specimens is unknown as yet. The theory posited here is that specimens 1, 2, 4 and 6 had unusual photonic responses due to an abundant presence of PCZs in the amorphous $SiO_2:H_2O$ matrix that caused partial internal strain of semi-amorphous PC silicates.

CONCLUSIONS

The present discovery identified and examined rare silicate materials, made of precious opal, that exhibited a previously undiscovered property of CPP. CPP enabled wireless three-dimensional photonic control over visible wavelengths via demultiplexed diffraction, upconversion and/or downconversion of incident light with photonic coherence. The shape of the incident light source was propagated over three dimensions and across visible light frequencies. CPP events visibly glided and rotated over proximal or distal surfaces as the specimens were moved or rotated relative to the incident lights and viewer. CPP was most prominent as a reflective property and much less prominent as a transmissive property. CPP events remained visible as each specimen was spatially manipulated under each incident visible light source. Observations of CPP occurred when the specimens and/or light sources were rotated relative to the viewer and over a variety of poly and monochromatic light sources. CPP events were most strongly and frequently observed proximally rather than distally (FIG. 1).

CPP and rotational properties were studied in isolation from exogenous thermal, photonic and electrical influences. Furthermore, the specimens exhibited these newly discovered properties without high energy fields, radioactive elements or any other potentially environmentally unfriendly aspects.

The CPP and other photonic behaviors of each specimen were at least partially different from each of the others. The photonic control demonstrated by the specimens, particularly regarding CPP and PPOI rotation, contradicts common thought that precious opal is comprised of randomly oriented islands of pseudo-crystallinity which lack the ability to photonically behave in concert over a macroscopic volume.

Changes in the wavelength character of the incident light sources caused changes in the presence, strength and character of specimen photonic responses. Each of the photonic properties of each specimen was affected by the different incident light sources. The CPP materials propagated the shape of the incident photon source in multiple copies over multiple diffracted wavelengths. Furthermore, each CPP specimen displayed photonic diffraction, upconversion and/or downconversion properties that varied when different mono and polychromatic light sources were applied. The CPP materials upconverted and downconverted incident monochromatic and polychromatic fiber optic light to generate polychromatic CPP events.

The specimens found to be the most unusual for each laser source were: specimen 2 for 650 nm laser, specimens 2 and 6 for 593.5 nm laser, specimens 5 and 6 for 532 nm laser, specimens 2 and 4 for 450 nm laser and specimens 7 and 8 for 405 nm laser (Table 3). The specimens found to be most unusual for each UV source were: specimens 5 and 7 for 375 nm photons, specimens 1, 2 and 4 for 307 nm photons and specimen 1 for 254 nm photons (Table 4). Specimen 3 was the only specimen that did not distinguish itself photonically for any of the mono-frequency examinations. Specimen 2 was the specimen that was most often identified as unusual in these mono-frequency examinations. Specimen 3 had mostly mildly positive CPP and specimen 2 had mostly moderately positive CPP. Hence, it may be possible to identify or anticipate the CPP property from the unusual interaction of a specimen with particular visible laser and/or UV wavelengths. While none of the specimens displayed CPP in response to UV light, this author discovered play-of-color in response to UV light for two specimens, which had not been documented previously.

Incident, reflected and transmitted PPOI were observed for almost all specimens (FIG. 1). Incident PPOI almost always assumed the same shape, color(s) and orientation as the photon source. Transmitted PPOI was the most subject to distortion. While reflected and transmitted PPOI virtually always assumed the same shape as the photon source, they did not always propagate the incident color(s).

The specimens applied an unexpected axial rotational symmetry over incident lights. Almost all reflected and transmitted PPOI displayed an axial rotation of 180° of the incident PPOI for all visible light sources. Axial rotation was more easily observable for asymmetrical light sources. A specular internal reflection off of the bottom of a specimen could not have caused the observed PPOI rotation. Rotation occurred prior to incident PPOI reaching the distal side of the specimen since transmitted PPOI had also been rotated axially. Since opal is, overall, non-crystalline, this unexpected symmetry operation discovery requires further study.

Specimen 3 was particularly sensitive to the angle of incident PPOI, relative to the viewer. Regardless of the incident light chromaticity, specimen 3 had virtually the same angle-dependent response. Hence, specimen 3 upconverted and/or downconverted incident light often and reliably. When incident light was about 90° relative to the viewer, CPP and play-of-color events were mostly large visible wavelengths and when the incident light was at any other angle, CPP and non-CPP events were mostly small visible wavelengths. Specimens 3 and 5 had the highest maximum hydration percentages of the specimens, which did not correlate to the presence or strength of photonic properties.

The more complex spectrophotometric scans were likely to be scans of active PCZs that were caught in the act of displaying contra luz, play-of-color or CPP. The scan differences indicated that spectrophotometric results depended on the light path and orientation of a specimen, even though there were no visible intra-specimen differences in color tones or clarity. The spectrophotometric scans that displayed particularly strong peak systems (specimens 3, 5, 6, 7 and 8) gave fresh insight into active play-of-color, contra luz or CPP events that was undocumented previously.

Polariscopically revealed strain and isogyre figures indicated that most of the present research specimens had uncommon microsphere organizations. Even so, all of the specimens were isotropic. Yet, the specimens that demonstrated the strongest presence of CPP were not strongly correlated to displaying the most unusual polariscopic responses. Thermal conductivity and refractive index analyses confirmed the mineral species of the specimens to be precious opal. The specimens did not have sufficient PCZs to cause either test to indicate significant crystalline silicate composition. With increased instrumentation sensitivity, the slight differences in thermal conductivity readings among the specimens may be a future method to identify CPP materials.

Dichroscopy confirmed no dichroism, as expected. However, an asynchromatic response, showing dichroism of seven of the specimens when viewed through active contra luz events. This dichroscopic contra luz response had not been documented previously. All of the specimens allowed 3-d photonic control to various extents. This research demonstrated that 3-d photonic output can be controlled by altering the relative angle of the specimen to incident light to viewer and by altering the chromaticity of incident light. As each specimen was relocated, relative to the incident light source and viewer, intact CPP events were manifested. Some of the CPP events maintained the same chromaticity while gliding over the specimen and other CPP events changed colors as the relative angles changed. Yet, in all CPP and PPOI events, the shape of the original incident light was propagated with axial rotation. CPP and PPOI events were phenomenologically distinct properties and did not appear to be predictive or causative of each other.

The invention claimed is:

1. A method of performing simultaneous upconversion and downconversion using a working material made of nano-silicates or nano-silicate type assemblies in order to propagate the shape of the incident light source over multiple visible frequencies.

2. A method of propagating a plurality of shapes of demultiplexed light from a polychromatic incident light source, comprising:

illuminating a working material made of nano-silicates or nano-silicate type assemblies with multiple visible frequencies such that the incident shapes of the polychromatic light source are propagated over demultiplexed frequencies in order to facilitate an image transmission.

* * * * *